(12) United States Patent
Kim et al.

(10) Patent No.: US 10,178,377 B2
(45) Date of Patent: Jan. 8, 2019

(54) 3-DIMENSIONAL IMAGE DISPLAY DEVICE AND METHOD FOR DESIGNING 3-DIMENSIONAL IMAGE DISPLAY DEVICE

(71) Applicant: Korea Institute of Science and Technology, Seoul (KR)

(72) Inventors: Sung Kyu Kim, Seoul (KR); Ki-hyuk Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 569 days.

(21) Appl. No.: 15/041,294

(22) Filed: Feb. 11, 2016

(65) Prior Publication Data
US 2016/0360188 A1    Dec. 8, 2016

(30) Foreign Application Priority Data

Jun. 4, 2015 (KR) .......................... 10-2015-0079146

(51) Int. Cl.
| | |
|---|---|
| *H04N 13/305* | (2018.01) |
| *H04N 13/31* | (2018.01) |
| *H04N 13/317* | (2018.01) |
| *H04N 13/324* | (2018.01) |
| *H04N 13/376* | (2018.01) |

(Continued)

(52) U.S. Cl.
CPC ........... *H04N 13/305* (2018.05); *H04N 13/31* (2018.05); *H04N 13/317* (2018.05); *H04N 13/324* (2018.05); *H04N 13/351* (2018.05); *H04N 13/376* (2018.05); *H04N 13/373* (2018.05)

(58) Field of Classification Search
CPC .... H04N 13/305; H04N 13/31; H04N 13/317; H04N 13/351; H04N 13/373; H04N 13/376
USPC .......................................................... 348/59
See application file for complete search history.

(56) References Cited

U.S. PATENT DOCUMENTS

| | | | |
|---|---|---|---|
| 9,185,397 B2 | 11/2015 | Kim et al. | |
| 2005/0083246 A1 | 4/2005 | Saishu et al. | |

(Continued)

FOREIGN PATENT DOCUMENTS

| | | |
|---|---|---|
| JP | 2014-510935 A | 5/2014 |
| KR | 10-2005-0025935 A | 3/2005 |
| KR | 10-2011-0065982 A | 6/2011 |

*Primary Examiner* — Jamie J Atala
*Assistant Examiner* — Kathleen V Nguyen
(74) *Attorney, Agent, or Firm* — NSIP Law

(57) ABSTRACT

Disclosed is a 3-dimensional image display device, which includes: an image display panel including a plurality of sub-pixels arranged in a lattice pattern; and an optical plate disposed spaced apart from the image display panel and including a plurality of light transmission regions or a backlight panel disposed spaced apart from the image display panel and including a plurality of light emission units, wherein the plurality of light transmission regions or light emission units are inclined from a vertical direction, wherein the image display panel includes: a reference data row which forms a reference viewing zone; and at least one data row which forms an intervening viewing zone, wherein the reference viewing zone includes a plurality of unit reference viewing zones, and wherein the intervening viewing zone includes at least one unit intervening viewing zone located between the unit reference viewing zones adjacent to each other.

19 Claims, 41 Drawing Sheets

(51) Int. Cl.
*H04N 13/351* (2018.01)
*H04N 13/373* (2018.01)

(56) References Cited

U.S. PATENT DOCUMENTS

| | | | |
|---|---|---|---|
| 2011/0141560 A1* | 6/2011 | Kim | G02B 27/2214 359/463 |
| 2013/0314779 A1* | 11/2013 | Lee | G09G 3/003 359/462 |
| 2014/0232837 A1 | 8/2014 | Kim et al. | |

* cited by examiner

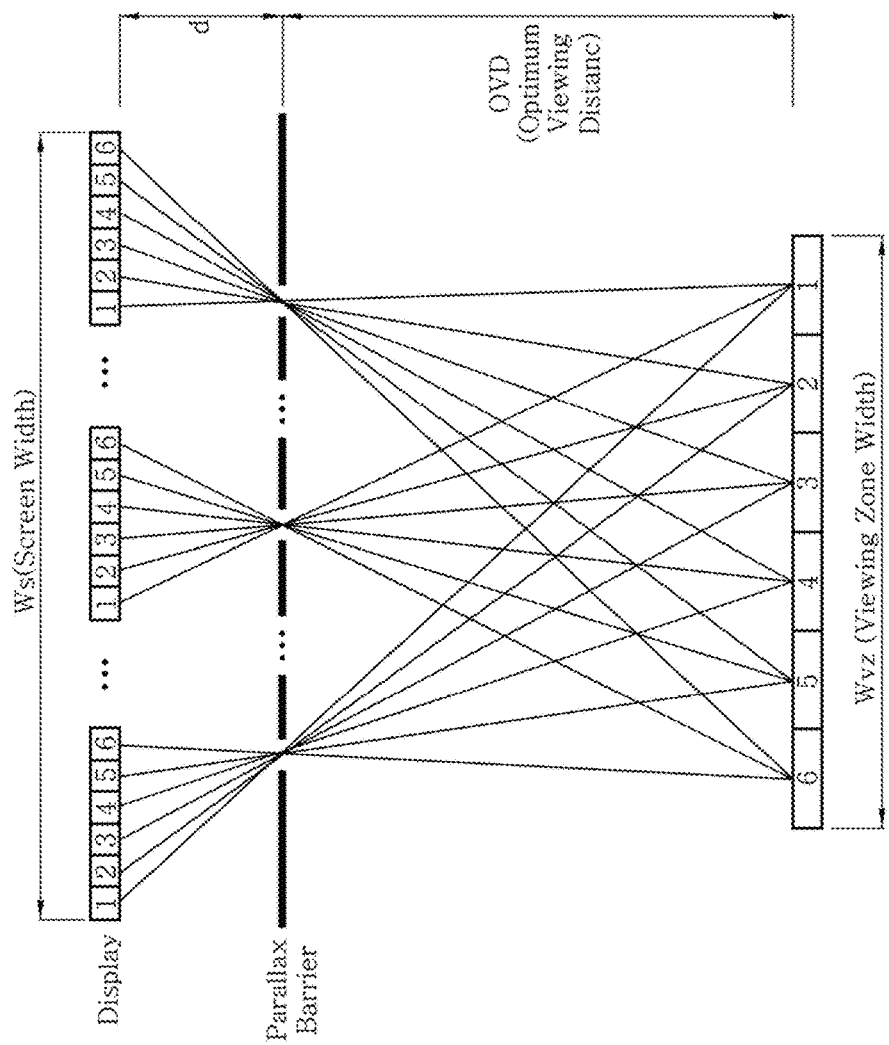

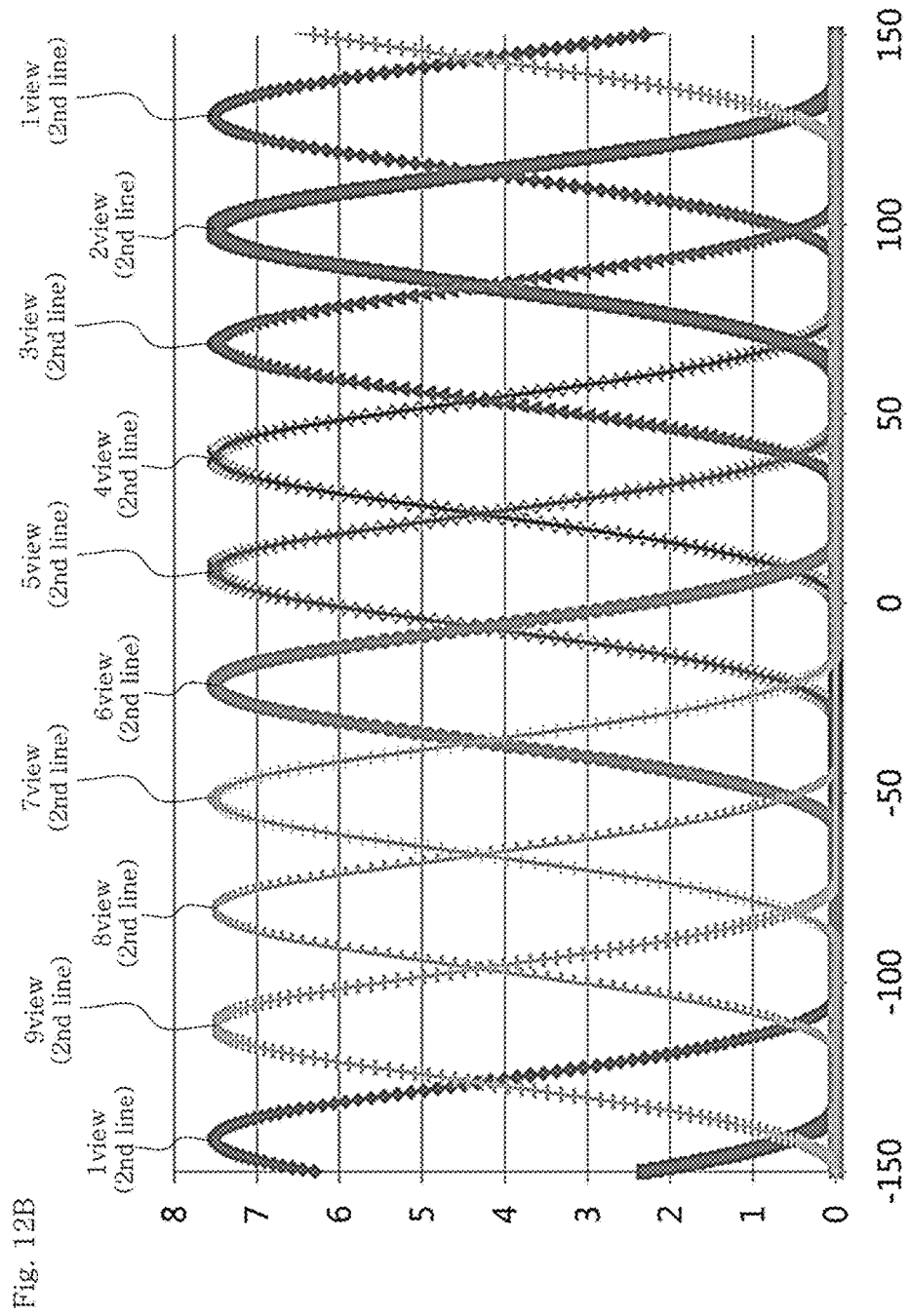

3-DIMENSIONAL IMAGE DISPLAY DEVICE AND METHOD FOR DESIGNING 3-DIMENSIONAL IMAGE DISPLAY DEVICE

CROSS-REFERENCE TO RELATED APPLICATION

This application claims priority to Korean Patent Application No. 10-2015-79146, filed on Jun. 4, 2015, and all the benefits accruing therefrom under 35 U.S.C. § 119, the contents of which in its entirety are herein incorporated by reference.

BACKGROUND

1. Field

Embodiments relate to a 3-dimensional image display device and a method for designing a 3-dimensional image display device. More particularly, the embodiments relate to a method for forming a viewing zone, when a backlight panel, a parallax barrier or a lenticular lens for determining an advancing direction of light from the 3-dimensional image display device is inclined.

2. Description of the Related Art

To provide a 3-dimensional stereo image, different images should be provided to both eyes of an observer. For this, a 3-dimensional image display device may use a parallax barrier or a lenticular lens as a parallax separation means to separate an image provided to the left eye of the observer and an image provided to the right eye of the observer from each other. In other cases, a plurality of linear light sources may be arranged behind an image display panel having pixels to determine pixels to be provided to the left or right eye of the observer.

FIG. 1 is a diagram for illustrating a viewing zone formed by a 3-dimensional image display device. This is based on a case where a parallax barrier is applied as a parallax separation means. Referring to FIG. 1, light from a sub-pixel passes through an opening of the parallax barrier and forms a viewing zone at an optimum viewing distance (OVD). FIG. 1 shows a case of a multi-view 3-dimensional image display device which forms a common viewing zone at an optimum viewing distance. At this time, the common viewing zone may be formed by designing the parallax barrier so that a plurality of unit viewing zones forming sub-pixels are converged at a specific position. FIG. 1 depicts only a central viewing zone formed by the light passing through the parallax barrier from an image display panel where a viewpoint image is disposed. A side viewing zone (not shown) is presented adjacent to the central viewing zone.

FIG. 2 shows parallax barriers with different slopes. The parallax barrier depicted in FIG. 2A is configured so that unit parallax barriers extend in a vertical direction and are arranged in a horizontal direction. Meanwhile, the parallax barrier depicted in FIG. 2B is configured so that a unit parallax barrier has a slope from the vertical direction. Number ("1" to "6") marked in a RGB sub-pixel represents viewpoint data which is mapped with the corresponding sub-pixel. In other words, the 3-dimensional image display device of FIGS. 2A and 2B may express six viewpoints, and third viewpoint image information recognized by an observer through an opening of the parallax barrier of FIG. 2A is arranged at blue (B) sub-pixels.

In case of the vertical parallax barrier depicted in FIG. 2A, at an optimum observation position (an OVD position in a depth direction and a central position of the viewing zone in a horizontal direction) of any one viewing zone, the light formed from a sub-pixel where image information of an adjacent viewpoint is disposed is not observed, and thus crosstalk between viewpoint images is ideally not generated. Also, even at a position deviated from the central position of the viewing zone, less crosstalk is generated between adjacent viewing zones in comparison to an inclined parallax barrier. However, chromatic dispersion occurs at each viewing zone since, for example, a third viewing zone is formed only in blue, and as the number of viewpoints increases, the resolution of a 3D image is deteriorated only in a horizontal direction.

Meanwhile, in case of an existing inclined parallax barrier as shown in FIG. 2B where a tilt angle is arcTan (⅓), two problems of a vertical parallax barrier as above may be solved. However, since a sub-pixel generally has a rectangular structure, even at an optimum observation position of the corresponding viewing zone, information of an adjacent viewing zone (for example, a second viewing zone and a fourth viewing zone in FIG. 2B) is provided to an observer together. In other words, crosstalk increases. In addition, in a 3D image display device designed with an inclined parallax barrier, severe Moire phenomenon is observed beyond the optimum viewing distance, and the quality of the 3D image deteriorates.

To solve the above problems, Korean Unexamined Patent Publication No. 10-2005-0025935 discloses that pixels are not arranged in a lattice pattern as shown in FIG. 3 but sub-pixels arranged in one row in a horizontal direction and sub-pixels arranged in an adjacent row are arranged alternately. In this case, even though a vertical lenticular lens is used, chromatic dispersion does not occur at each viewing zone. In addition, a deterioration ratio of resolution caused by increasing the number of viewpoints may be adjusted in both the horizontal direction and the vertical direction. However, this structure is not applicable to a general stripe-type horizontal RGB sub-pixel structure (where RGB sub-pixels are arranged in a lattice pattern, and one row of sub-pixels in a vertical direction are configured with sub-pixels of the same color) as shown in FIG. 2.

As another example using an inclined parallax barrier, Korean Unexamined Patent Publication No. 10-2011-0065982 discloses that a sub-pixel has a parallelogram shape having the same slope as the parallax barrier as shown in FIG. 4. In other words, in this structure, crosstalk is minimized by preventing information of an adjacent viewing zone from being provided to an observer at optimum observation position through the opening of the parallax barrier. However, this structure is also not applicable to a general stripe-type pixel structure, crosstalk is minimized only at a parallax barrier inclined with the same slope as the inclined structure, and a tilt angle of the inclined parallax barrier may not be changed as desired.

Meanwhile, in case of an existing general multi-view 3D image display device as shown in FIG. 5, a horizontal range in which all pixels of the image display panel are observable at an optimum viewing distance is formed narrowly in comparison to the width of the image display panel. Therefore, the degree of freedom in horizontal mobility of the observer is not so great even at the optimum viewing distance (L). In addition, if the observer is located at a border between the central viewing zone and the side viewing zone, a pseudoscopic image is observed. Moreover, even though the observer is within the central viewing zone, if the observer is beyond the optimum viewing distance, the degree of freedom in mobility in a horizontal direction is further restricted.

RELATED LITERATURES

Patent Literature (Patent Literature 1) KR10-2005-0025935 A
(Patent Literature 2) KR10-2011-0065982 A

SUMMARY

The present disclosure is directed to increasing the number of expressible viewpoints and decreasing crosstalk between viewing zones while using a stripe-type sub-pixel structure.

The present disclosure is also directed to allowing an observer to observe a 3-dimensional stereo image with a minimized Moire pattern as if the observer is at an optimum viewing distance, even though the observer moves in a depth direction beyond the optimum viewing distance.

The present disclosure is also directed to providing a 3-dimensional image display device having a maximum number of viewpoints without exhibiting a chromatic dispersion effect.

In one aspect, there is provided a 3-dimensional image display device, which includes: an image display panel including a plurality of sub-pixels arranged in a lattice pattern; and an optical plate disposed spaced apart from the image display panel and including a plurality of light transmission regions or a backlight panel disposed spaced apart from the image display panel and including a plurality of light emission units, wherein the plurality of light transmission regions or light emission units are inclined from a vertical direction, wherein the image display panel includes: a reference data row which forms a reference viewing zone; and at least one data row which forms an intervening viewing zone, wherein the reference viewing zone includes a plurality of unit reference viewing zones, and wherein the intervening viewing zone includes at least one unit intervening viewing zone located between the unit reference viewing zones adjacent to each other.

In an embodiment, the reference data row and at least one data row forming the intervening viewing zone may configure one cycle.

In an embodiment, a tilt angle of the plurality of light transmission regions or light emission units from a vertical direction may be expressed as $$\theta = \arctan\left(\frac{3W_h}{W_v}\frac{k}{n}\right)$$

(where Wh represents a width of the sub-pixel in a horizontal direction, Wv represents a length of the sub-pixel in a vertical direction, n represents a natural number of 4 or above, k represents a natural number of 1 or above, k/n<⅓, and k/n is an irreducible fraction), and at least one data row forming the intervening viewing zone may be a (n/3)−1 number of data rows when n is a multiple of 3 and an n−1 number of data row when n is not a multiple of 3.

In an embodiment, the reference data row may be a first data row among data rows of the one cycle.

In an embodiment, the reference data row may be a data row including a sub-pixel closest to a reference light transmission region or a reference light emission unit at one side of the reference light transmission region or the reference light emission unit, among data rows of the one cycle.

In an embodiment, when at least one data row forming the intervening viewing zone is a k number of data rows, at least one data row forming the intervening viewing zone may form a k number of unit intervening viewing zones between two unit reference viewing zones adjacent to each other.

In an embodiment, at least one data row forming the intervening viewing zone may form the k number of unit intervening viewing zones in order from a data row having a shortest minimum distance between a reference light transmission region or a reference light emission unit and a sub-pixel of the corresponding data row, at one side of the reference light transmission region or the reference light emission unit.

In an embodiment, an tilt angle θ of the plurality of light transmission regions or the light emission unit may be equal to or greater than $$\tan^{-1}\left[\frac{3W_h}{W_v}\frac{k}{n'}\right]$$

(where n' represents a greatest value among natural numbers not greater than $$1 + \sqrt{\frac{4L^2\tan^2\frac{\pi}{10800} - (3k-1)^2W_h^2}{W_v^2}},$$

L represents a distance between the 3-dimensional image display device and an observer, k represents a natural number of 1 or above, and k/n' is an irreducible fraction) and smaller than arctan (⅓).

In an embodiment, each data row may form an N number of viewpoints, and among sub-pixels expressing the same viewpoint in each data row, two sub-pixels closest to each other may have a distance smaller than $$2L\tan\frac{\beta}{2}$$

(L represents a distance between the 3-dimensional image display device and an observer, and β is ¹⁄₃₀°).

In an embodiment, N may be a greatest value among natural numbers smaller than a value obtained by dividing $$2L\tan\frac{\beta}{2}$$

by a width of the sub-pixel.

In an embodiment, at a maximum observation distance in a depth direction of the 3-dimensional image display device, a viewpoint interval between two unit viewing zones formed from image information mapped to two adjacent sub-pixels of one data row may be narrower than an intervening pupil distance between both eyes of an observer.

In an embodiment, the optical plate may be a parallax barrier, the light transmission region may be an opening of the parallax barrier; or the optical plate may be a lenticular lens, and the light transmission region may be a surface region of the lenticular lens through which light passes, and the light emission unit may be a linear light source or a partially shielded surface light source.

In an embodiment, the 3-dimensional viewing zone at the optimum viewing distance formed from the image display panel may have a central viewing zone in which the width of the horizontal direction is greater than the width of the image display panel in a horizontal direction.

In an embodiment, in an observation range of a 3-dimensional image formed by any one of the plurality of sub-pixels, the intensity of the unit viewing zone may have a trapezoidal shape in which the intensity is consistently maintained at the center of the viewing zone within a predetermined horizontal direction range.

In an embodiment, the width of the light transmission region or the light emission unit may be greater than 0% and smaller than 30% in comparison to the width of the sub-pixel.

In an embodiment, the cycle of the light transmission region or the light emission unit may be greater than the cycle of the light transmission region or the light emission unit of a multi-view 3-dimensional image display device forming a common viewing zone and smaller than the cycle of the light transmission region or the light emission unit of an integral-photography 3-dimensional image display device, and in this case, a modified common viewing zone may be formed.

In an embodiment, when a ratio of a size (E) of the unit viewing zone formed at a consistent observer depth direction by the 3-dimensional image display device forming a modified common viewing zone to a difference (ΔE) of horizontal positions of adjacent viewing zones formed through an opening or lenticular lens of a parallax barrier adjacent thereto is defined as α (=E/ΔE), α may be 8 or above.

In an embodiment, the 3-dimensional image display device may further include: a face-position or head-position tracking system for tracking a face position or a head position of an observer; and a control unit for controlling a plurality of sub-pixels of the image display panel, and the control unit may adjust a horizontal position of the central viewing zone by remapping the viewpoint data with each sub-pixel according to a position of the observer by using the face or head position tracked by the tracking system.

In another aspect of the present disclosure, there is provided a method for designing a 3-dimensional image display device, which includes: determining the number of viewpoints and a viewpoint interval which are to be expressed as one data row of an image display panel including a plurality of sub-pixels; determining a tilt angle θ of a plurality of light transmission regions included in an optical plate or a plurality of light emission units included in a backlight panel; determining a reference data row for forming a reference viewing zone and at least one data row for forming an intervening viewing zone, based on the tilt angle θ; mapping viewpoint data with sub-pixels of the reference data row; and mapping the viewpoint data with sub-pixels of at least one data row where the intervening viewing zone is to be formed, wherein the reference viewing zone includes a plurality of unit reference viewing zones, and wherein the intervening viewing zone includes at least one unit intervening viewing zone located between the unit reference viewing zones adjacent to each other.

In an embodiment, the determining of a reference data row for forming a reference viewing zone and at least one data row for forming an intervening viewing zone, based on the tilt angle θ, may include: determining the number of data rows which configure one cycle according to the tilt angle θ; determining any one of data rows of the one cycle as the reference data row; and determining a data row other than the reference data row among the data rows of the one cycle as at least one data row where the intervening viewing zone is to be formed.

In an embodiment, in the determining of the number of data rows which configure one cycle according to the tilt angle θ, the tilt angle θ may be expressed as $$\theta = \arctan\left(\frac{3W_h}{W_v}\frac{k}{n}\right)$$

(where $W_h$ represents a width of a sub-pixel, $W_v$ represents a length of the sub-pixel, n represents a natural number of 4 or above, k represents a natural number of 1 or above, $k/n < 1/3$, and $k/n$ is an irreducible fraction), and wherein one cycle is configured with an $n/3$ number of successive data rows when n is a multiple of 3, and one cycle is configured with an n number of successive data rows when n is not a multiple of 3.

In an embodiment, the determining of any one of data rows of the one cycle as the reference data row may include: determining any one of the plurality of light transmission regions as a reference light transmission region or determining any one of the plurality of light emission units as a reference light emission unit; and determining a data row including a sub-pixel closest to the reference light transmission region or the reference light emission unit at one side of the reference light transmission region or the reference light emission unit as a reference data row, among the data rows of the one cycle.

In an embodiment, in the mapping of the viewpoint data with sub-pixels of at least one data row where the intervening viewing zone is to be formed, when at least one data row where the intervening viewing zone is to be formed is a k number of data row, the viewpoint data may be mapped with the sub-pixels of at least one data row where the intervening viewing zone is to be formed so that at least one data row forming the intervening viewing zone forms a k number of unit intervening viewing zones between two unit reference viewing zones adjacent to each other.

In an embodiment, in the mapping of the viewpoint data with sub-pixels of at least one data row where the intervening viewing zone is to be formed, the viewpoint data may be mapped so that the k number of unit intervening viewing zones is formed in order from a data row having a shortest minimum distance between the reference light transmission region or the reference light emission unit and a sub-pixel of the corresponding data row, at one side of the reference light transmission region or the reference light emission unit.

In an embodiment, in the determining of a tilt angle θ, the tilt angle θ may be determined within a range equal to or greater than $$\tan^{-1}\left[\frac{3W_h}{W_v}\frac{k}{n'}\right]$$

(where n' represents a greatest value among natural numbers not greater than $$1 + \sqrt{\frac{4L^2\tan^2\frac{\pi}{10800} - (3k-1)^2 W_h^2}{W_v^2}},$$

L represents a distance between the 3-dimensional image display device and an observer, k represents a natural number of 1 or above, and k/n' is an irreducible fraction) and smaller than arctan (⅓).

In an embodiment, in the determining of the number of viewpoints and a viewpoint interval which are to be expressed as one data row, the number of viewpoints to be expressed as one data row may be determined so that a distance of two sub-pixels closest to each other among sub-pixels mapped with the same viewpoint data in one data row is smaller than $$2L\tan\frac{\beta}{2}$$

(L represents a distance between the 3-dimensional image display device and an observer, and β is ⅟₃₀°).

In an embodiment, in the determining of the number of viewpoints and a viewpoint interval which are to be expressed as one data row, the number of viewpoints to be expressed as one data row is determined as a greatest value among natural numbers smaller than a value obtained by dividing $$2L\tan\frac{\beta}{2}$$

by a width of the sub-pixel.

In an embodiment, the method for designing a 3-dimensional image display device may further include determining a width of the sub-pixel so that a viewpoint interval between two unit viewing zones formed from image information mapped to two adjacent sub-pixels of one data row is narrower than an intervening pupil distance between both eyes of an observer, at a maximum observation distance in a depth direction of the 3-dimensional image display device.

According to one aspect of the present disclosure, it is possible to provide an optimum 3D image to an observer by reducing crosstalk.

According to one aspect of the present disclosure, an observation area where an observer may observe a clear 3-dimensional image having motion parallax is expanded in a depth direction beyond an optimum viewing distance and is widely formed in a horizontal direction in comparison to a 3D monitor to increase the degree of freedom in observation of the observer, and a viewing zone is formed between reference viewing zones to implement a 3-dimensional image having continuous motion parallax in a visible aspect. Also, a cycle of an optical plate (a parallax barrier or lenticular lens) for separating parallax at a position of the observer is used with an invisible condition at an observation position, and an observed Moire pattern which may occur while the observer is moving is minimized, so that a clear 3-dimensional image may be observed in a wide observation range including the depth direction.

According to one aspect of the present disclosure, it is possible to provide natural motion parallax within a range where chromatic dispersion does not occur.

BRIEF DESCRIPTION OF THE DRAWINGS

FIG. 1 is a diagram for illustrating a viewing zone formed by a 3-dimensional image display device.

FIGS. 12A-12D and 12E show intensity distribution of each viewing zone in a horizontal direction, formed at an optimum viewing distance by a 3-dimensional image display device according to the sixth embodiment of the present disclosure.

DETAILED DESCRIPTION

Hereinafter, embodiments of the present disclosure will be described in detail with reference to the accompanying drawings.

Figure 2A:
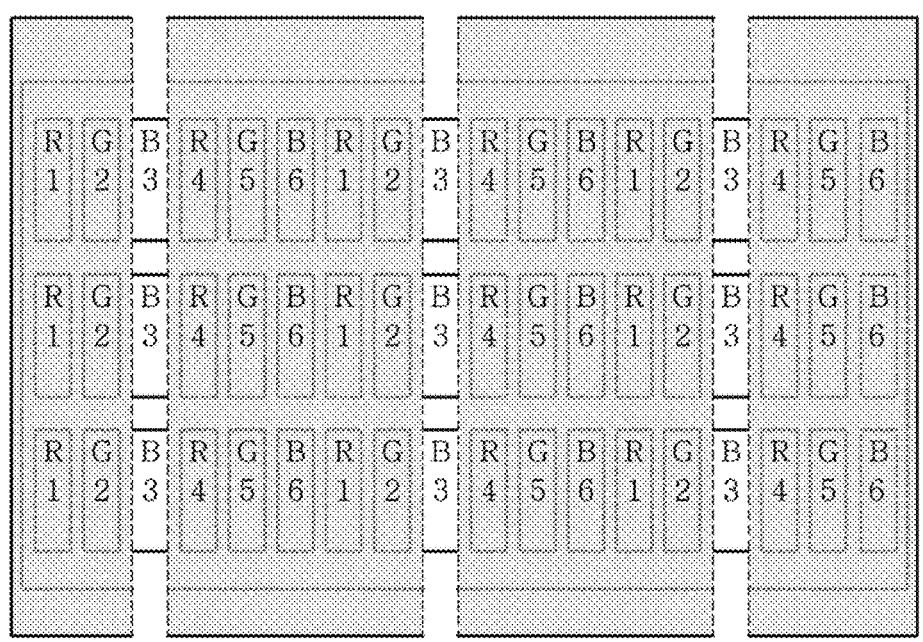
FIGS. 2A-2B are diagrams showing an arrangement of parallax barriers having two slopes.
Figure 2B:
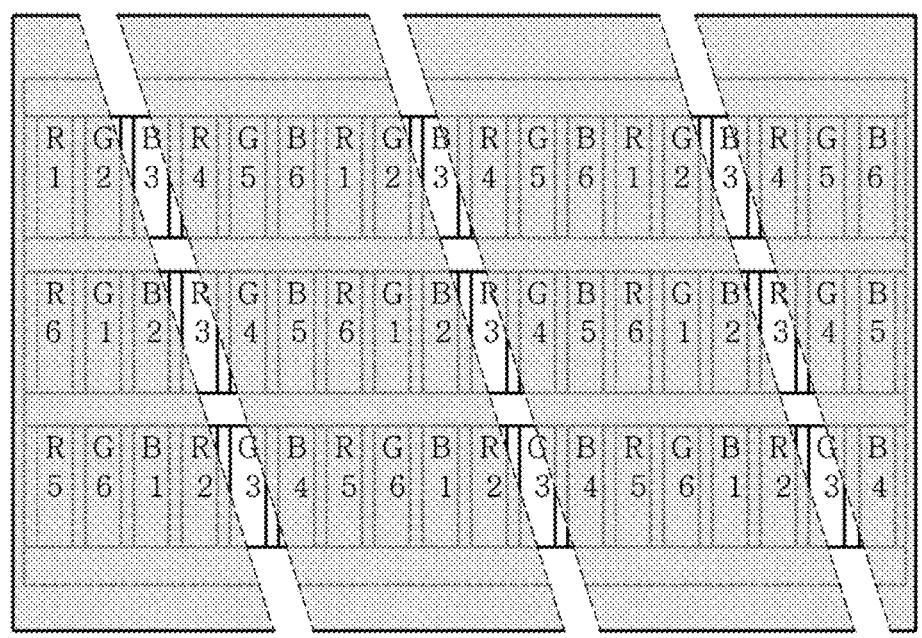
Figure 3:
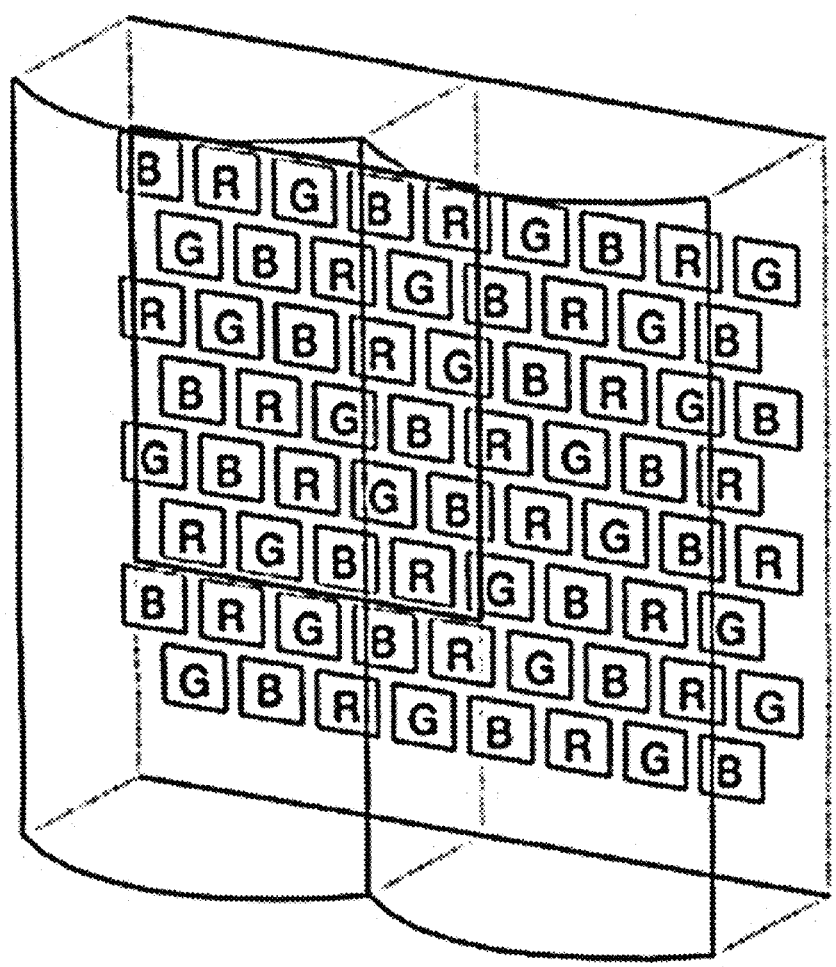
FIG. 3 is a schematic view showing a 3-dimensional image display device which includes sub-pixels and a vertical lenticular lens arranged alternately.
Figure 4:
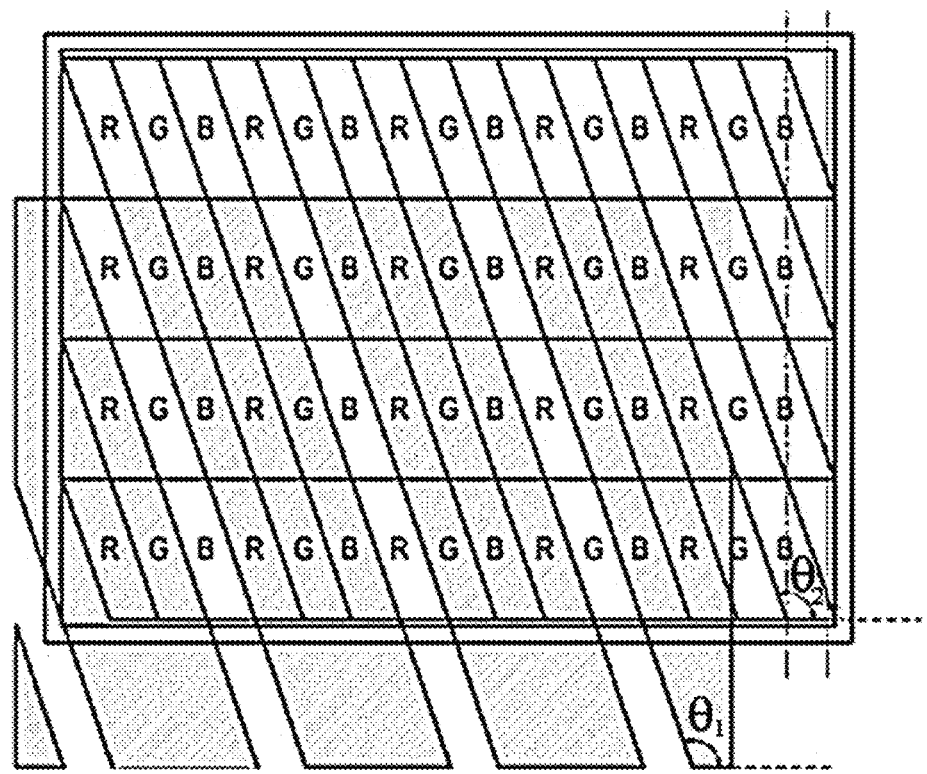
FIG. 4 is a schematic view showing a 3-dimensional image display device which includes an inclined parallax barrier and inclined sub-pixels.
Figure 5:
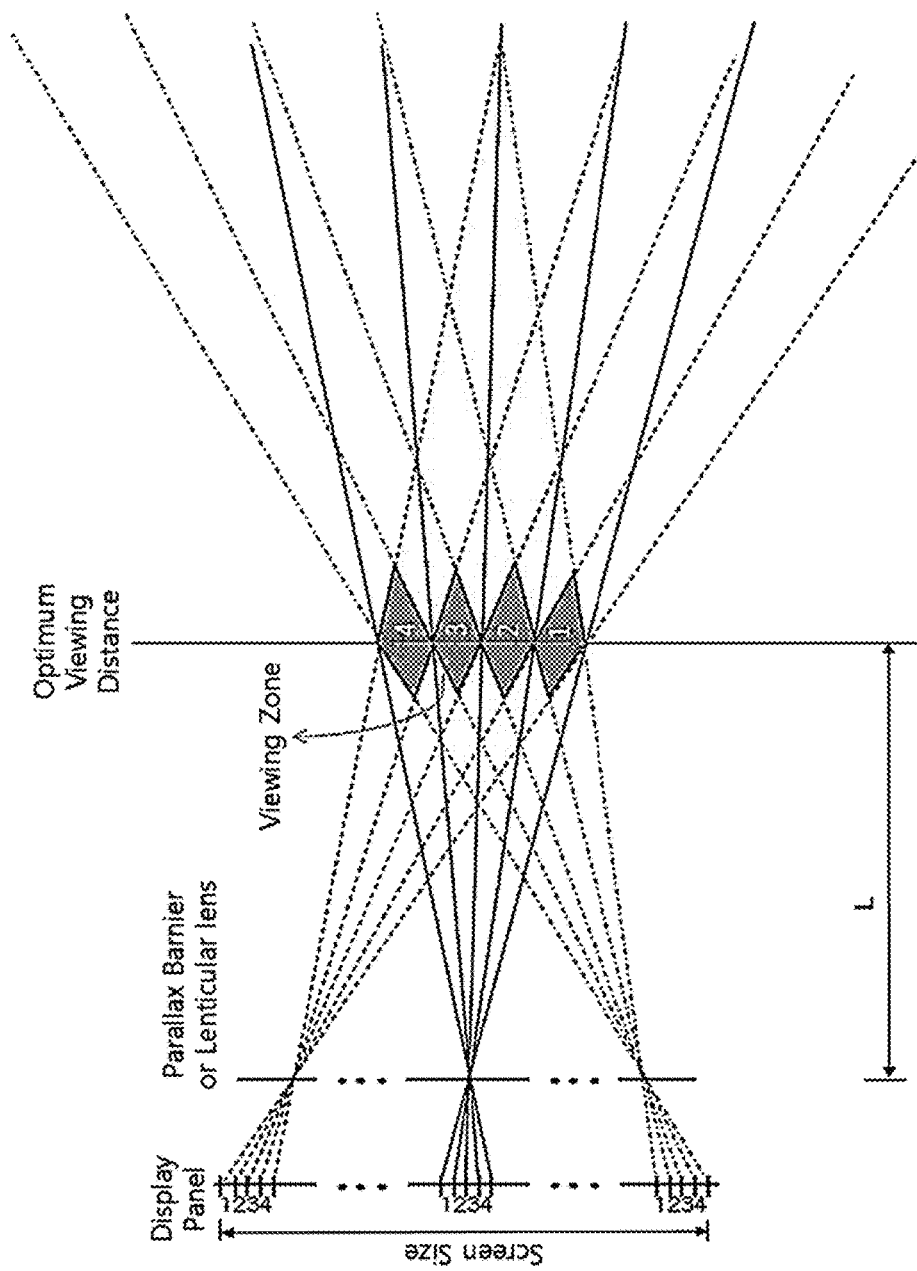
FIG. 5 is a diagram for illustrating a range of a viewing zone, formed by an existing general multi-view 3-dimensional image display device.
Figure 6:
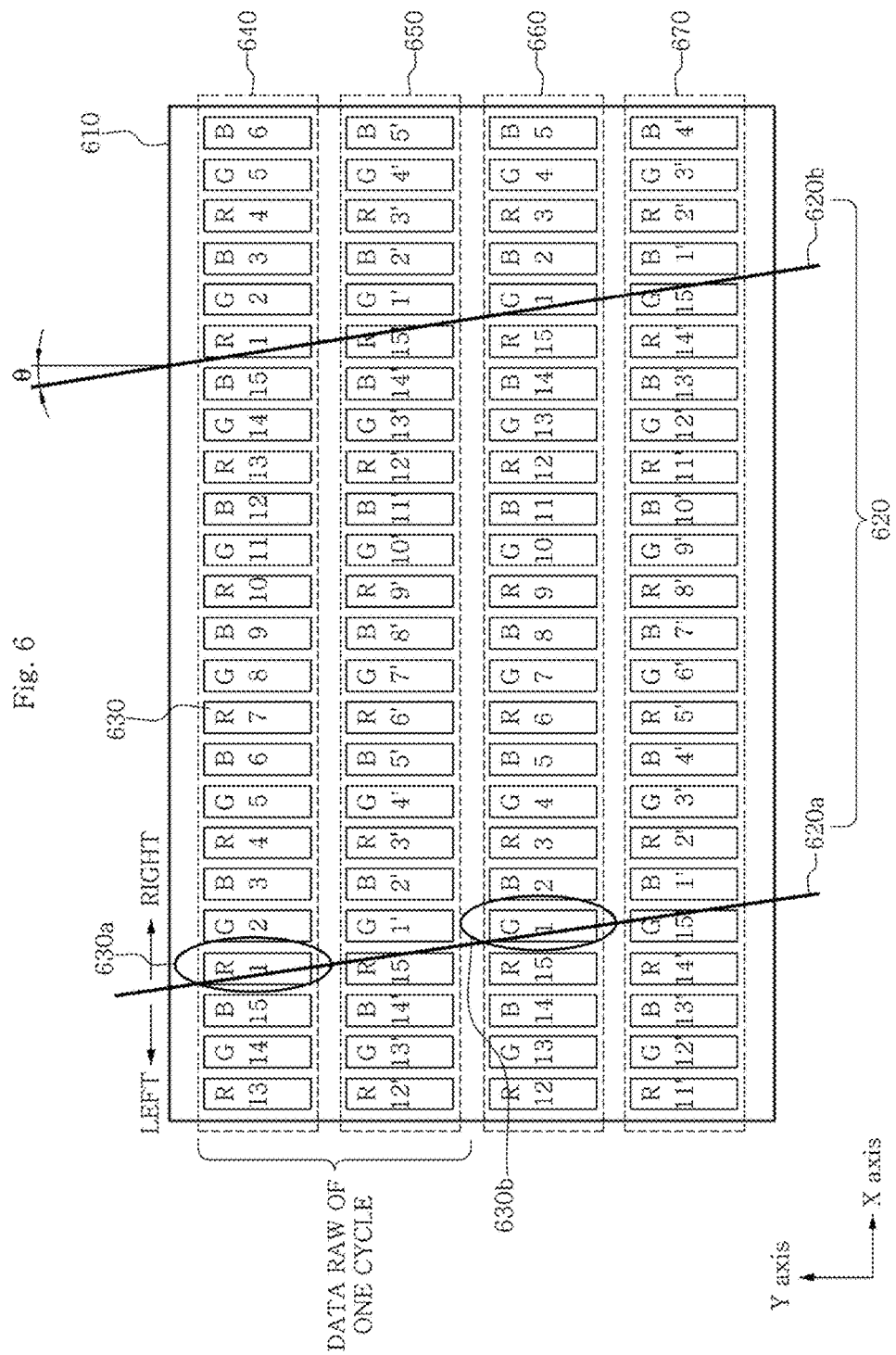
FIG. 6 is a schematic view showing a 3-dimensional image display device according to an embodiment of the present disclosure.

FIG. 6 is a schematic view showing a 3-dimensional image display device according to an embodiment of the present disclosure. Referring to FIG. 6, the 3-dimensional image display device may comprise an image display panel 610 having a plurality of sub-pixels 630 arranged in a lattice pattern and an optical plate including a plurality of light transmission regions 620. Or else, the 3-dimensional image display device may comprise an image display panel 610 and a backlight panel including a plurality of light emission units 620. The term "optical plate" used herein means an optical plate for parallax separation.

The image display panel 610 is a panel into which image data is input, and includes a plurality of data rows 640, 650, 660, 670. The data rows 640, 650, 660, 670 are composed of a plurality of sub-pixels 630 arranged in a horizontal direction (namely, an x-axis direction). In other words, the data rows 640, 650, 660, 670 mean sub-pixel rows.

The sub-pixel 630 has any one color of red (R), green (G) and blue (B). A pixel having a plurality of sub-pixels 630 may have a rectangular shape. For example, when the length of the sub-pixel 630 in a vertical direction is three times of the width thereof in a horizontal direction and a single pixel is composed of three sub-pixels 630, the pixel has a square shape. If the 3-dimensional image display device is designed to have an N number of viewpoints, any one viewpoint data among the first to $N^{th}$ viewpoints is mapped with each sub-pixel 630, and a viewing zone of the mapped viewpoint is formed on space at a position of an observer. The viewpoint data represents image information corresponding to any viewpoint, and when the viewpoint data is mapped, this means that viewpoint data is disposed at a sub-pixel. In the sub-pixel 630 of FIG. 6, each mapped viewpoint is marked with a numeral. For example, thirteen viewpoint data are mapped at a red (R) sub-pixel located at a left top and marked with "13", and the corresponding sub-pixel forms thirteen viewing zones on space (for example, at an optimum viewing distance (OVD)).

The optical plate may be a parallax barrier or a lenticular lens. The parallax barrier includes a plurality of unit parallax barriers, and an opening (or, a slit) serving as the light transmission region 620 through which light may pass is present between adjacent unit parallax barriers. The lenticular lens includes a plurality of unit lenses, and when the optical plate is a lenticular lens, the light transmission region 620 represents an area of a curved of each unit lens through which light may pass.

In an embodiment, the 3-dimensional image display device may perform parallax separation by adjusting the light emitted from a backlight panel, instead of the optical plate. The backlight panel includes a plurality of light emission units which emit light by themselves. The light emission unit 620 may be a linear light source, or may be composed of a means giving an effect like a linear light source by shielding a part of the surface light source and the surface light source. Hereinafter, the features and explanations applied to the light transmission region 620 may also be identically applied to the light emission unit 620.

For convenience, FIG. 6 depicts only a center or axis of the light transmission region 620 or the light emission unit 620. The center of the light transmission region 620 depicted in FIG. 6 represents a center position (or, an axis position) of the opening of the parallax barrier when the 3-dimensional image display device uses the parallax barrier as an optical plate, and if the optical plate is a lenticular lens, the center represents a center position (or, an axis position) of a unit lens. The 3-dimensional image display device may also be implemented using a light source at a rear surface of an image display panel, without using a parallax separation means at a front surface. When the linear light source is used at the rear surface, the center of the light emission unit 620 represents a center position (or, an axis position) of the linear light source, and when the surface light source is used at the rear surface, the center represents a center position (or, an axis position) of an unshielded region of the surface light source.

Referring to FIG. 6, the light transmission region 620 is inclined from a vertical direction (namely, a y-axis direction) at a tilt angle θ. In other words, an angle between an extension direction of the light transmission region 620 and a vertical direction is θ. Herein, when the optical plate or backlight panel has a tilt angle θ, this means that the light transmission region of the optical plate or the light emission unit of the backlight panel is inclined at a tilt angle θ.

The image display panel 610 includes a reference data row 640 which forms a reference viewing zone, on space. In the 3-dimensional image display device, the number of viewpoints (N) and a viewpoint interval (E) to be expressed as one data row are determined in advance, and the reference data row 640 forms a reference viewing zone having a viewpoint interval of E at an optimum viewing distance in a depth direction on space. At this time, the viewpoint interval (E) represents a distance between centers of two adjacent viewing zones. The image display panel 610 also includes at least one data row 650 which forms an intervening viewing zone. Even though FIG. 6 depicts that the data row 650 forming an intervening viewing zone is one data row, this is just an example, and in the present disclosure, a plurality of data rows may form an intervening viewing zone with respect to one reference data row 640, without being limited thereto.

The tilt angle θ of the light transmission region 620 may be expressed as Equation 1 below.

$$\theta = \arctan\left(\frac{3W_h}{W_v}\frac{1}{n}\right) \quad \text{Equation 1}$$

Here, $W_h$ represents a width of the sub-pixel 630 in a horizontal direction, $W_v$ represents a length of the sub-pixel 630 in a vertical direction, n represents a natural number of 4 or above.

In an embodiment, if n=3m (m is a natural number of 2 or above), an m number of data rows configure one cycle, and an N*m number of viewpoint is expressed on space. In other words, if the reference data row 640 is a $k^{th}$ data row, from a $k+1^{th}$ data row, an m−1 number of data rows ($k+1^{th}$ to $k+m-1^{th}$ data rows) form an intervening viewing zone. Meanwhile, if n is not a multiple of 3, an n number of data rows configures one cycle, and an N*n number of viewpoints may be expressed on space. In other words, if the reference data row 640 is a $k^{th}$ data row, from a $k+1^{th}$ data row, an n−1 number of data rows ($k+1^{th}$ to $k+n-1^{th}$ data rows) form an intervening viewing zone.

In an embodiment, after any one of the plurality of light transmission regions is determined as a reference light transmission region, among data rows configuring one cycle, a data row including a sub-pixel closest to the reference light transmission region is determined as a reference data row. In other words, the reference data row is determined regardless of which viewpoint data is mapped with the sub-pixel. When a distance between the sub-pixel and the reference light transmission region is measured, a distance between a center of the sub-pixel at one side of the reference light transmission region in its extension direction (for example, a right side of the reference light transmission region) and the reference light transmission region is measured. For example, based on the light transmission region 620a marked at a left side among the light transmission regions 620a, 620b depicted in FIG. 6, the data row 640 including a sub-pixel 630a having a center closest to the reference light transmission region 620a becomes a reference data row, among sub-pixels at a right side of the reference light transmission region 620a.

In addition, in another embodiment, among data rows configuring one cycle, a first data row may also be determined as the reference data row.

Since at least one data row 650 forming an intervening viewing zone is a data row subsequent to the reference data row 640, at least one unit intervening viewing zone is formed between two unit reference viewing zones adjacent to each other on space. Since each of at least one data row 650 forming an intervening viewing zone forms a single unit intervening viewing zone between two unit reference viewing zones adjacent to each other, unit intervening viewing zones are formed between two unit reference viewing zones adjacent to each other as much as the number of at least one data row 650 forming a intervening viewing zone subsequent to the reference data row 640.

Between a $p^{th}$ unit reference viewing zone (p=1, 2, . . . , N−1) and a $p+1^{th}$ unit reference viewing zone formed by the reference data row 640, at least one data row 650 forming an intervening viewing zone forms a unit intervening viewing zone in order from a row having a sub-pixel closest to the reference light transmission region 620a. This will be described with reference to FIG. 9 in which the third embodiment of the present disclosure is depicted.

Figure 9:
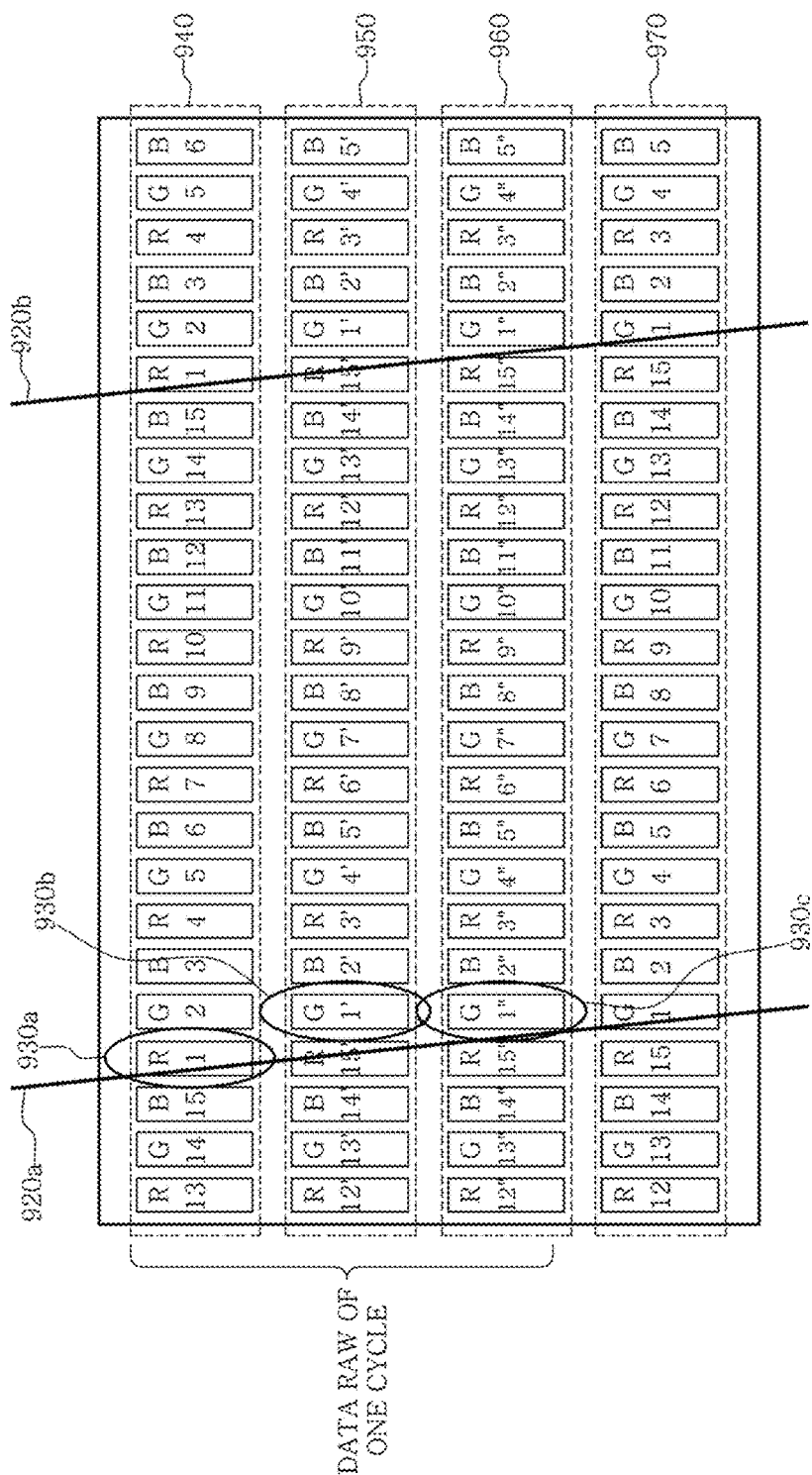
FIG. 9 is a diagram schematically showing a structure of a 3-dimensional image display device according to the third embodiment of the present disclosure.

In FIG. 9, sub-pixels having centers between two light transmission regions 920a, 920b among three data rows 940, 950, 960 configuring one cycle forms another cycle expressing a 3*N number of viewpoints, even in the one cycle of data rows (in the third embodiment, N=15). The data row 940 including a sub-pixel 930a having a center closest to the reference light transmission region 920a becomes a reference data row. The sub-pixel 930a of the reference data row 940 forms a first unit reference viewing zone, and a sub-pixel adjacent to the sub-pixel 930a in the reference data row 940 forms a second unit reference viewing zone adjacent to the first unit reference viewing zone. Two data rows 950, 960 subsequent to the reference data row form an intervening viewing zone between the reference viewing zones. Since the sub-pixel 930c of the data row 960 is closer to the reference light transmission region 920a in comparison to the sub-pixel 930b closest to the reference light transmission region 920a in the data row 950, the sub-pixel 930c of the data row 960 forms a unit intervening viewing zone closer to the first unit reference viewing zone in comparison to the sub-pixel 930b of the data row 950. In other words, when the data row 950 forms a $p'^{th}$ unit intervening viewing zone and the data row 960 forms a $p''^{th}$ unit intervening viewing zone, viewing zones are formed in the order of the $p^{th}$ unit reference viewing zone, the $p''^{th}$ unit intervening viewing zone, the $p'^{th}$ unit intervening viewing zone and the $p+1^{th}$ unit reference viewing zone.

Hereinafter, detailed embodiments of the present disclosure will be described with reference to FIGS. 6 to 12.

First Embodiment

First, a 3-dimensional image display device according to the first embodiment of the present disclosure will be described with reference to FIG. 6. The sub-pixel 630 of the image display panel 610 has a length (Wv) and a width (Wh) satisfying $3W_h=W_v$. The sub-pixels 630 are designed so that one data row forms fifteen viewpoints.

The opening 620 of the parallax barrier has a tilt angle of arctan (⅙). In other words, in Equation 1, n is 6. Since n is a multiple of 3 and n=2*3, viewpoint data are distributed so that two successive data rows form one cycle. The reference data row 640 form fifteen viewpoints serving as a reference for an optimum viewing distance. After that, intervening viewpoints are formed between reference viewpoints at the other data rows 650 of the same cycle. At this time, a progressing order of viewpoints in a horizontal direction within one cycle is 1-1'-2-2'-3-3'- . . . -15-15'.

The data rows 660, 670 other than two data rows 640, 650 are also mapped with the viewpoint data to express the same number of viewpoints as the number of viewpoints formed by two data rows 640, 650. The reference data row 640 of one cycle and the reference data row 660 of another cycle adjacent to the one cycle are moved in a horizontal direction as much as one sub-pixel in a slope direction of the opening 620 to form viewpoints. For example, the red sub-pixel 630a forming a first unit reference viewing zone of the reference data row 640 of a first cycle and the green sub-pixel 630c forming a first unit reference viewing zone of the reference data row 660 of a second cycle are present in adjacent sub-pixel rows, and thus have different colors.

As a result, even though it is designed to form fifteen viewpoints for each single data row, fifteen viewpoints are added between fifteen viewpoints serving as references to give an effect as if thirty viewpoints are formed in total. In addition, compared with a reference viewpoint interval (E) which is a distance between centers of viewing zones formed by adjacent sub-pixels in one data row, an interval between adjacent viewpoints at an optimum viewing distance is reduced into ½. Therefore, in comparison to a fifteen-viewpoint 3-dimensional image display device including a parallax barrier having a tilt angle of arctan (⅓), the number of viewpoints increases and the viewpoint interval decreases, thereby giving more natural motion parallax.

Comparative Example

Figure 7:
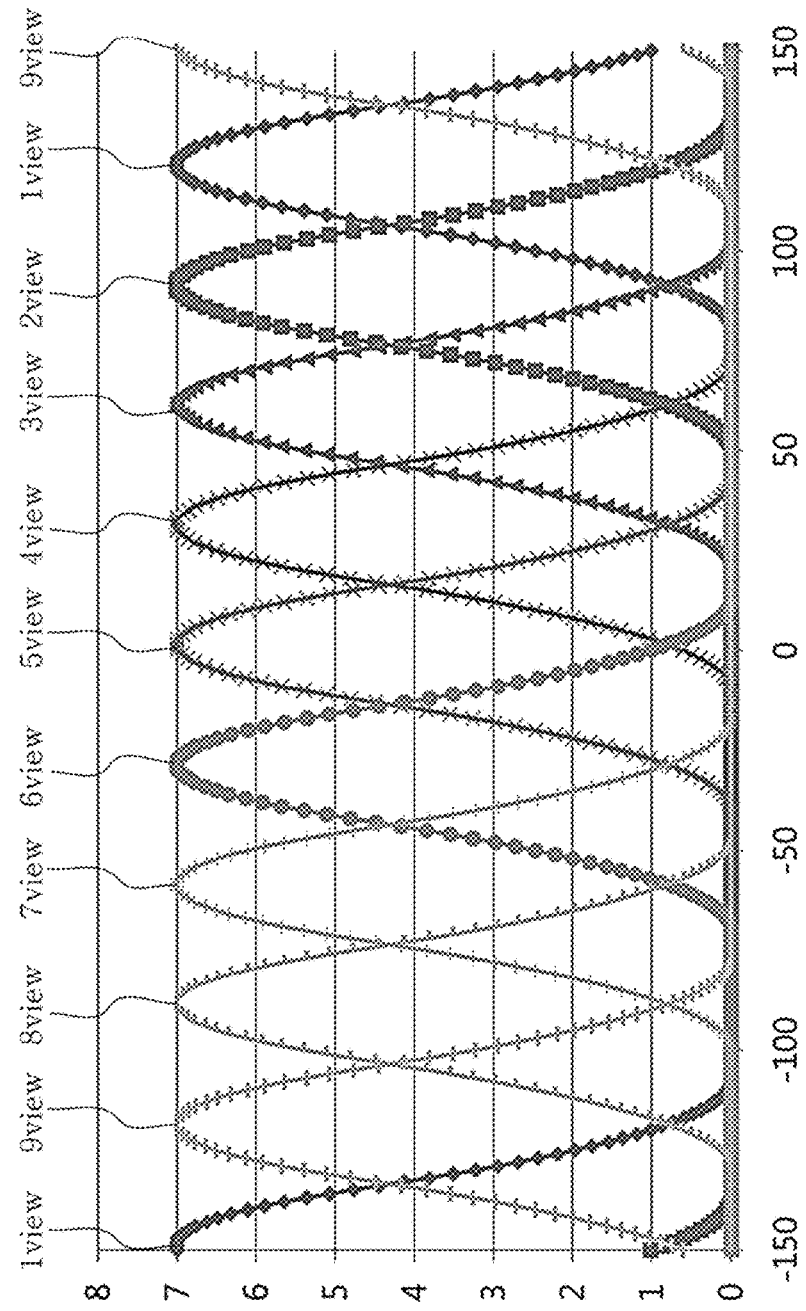
FIG. 7 shows intensity distribution of each viewing zone in a horizontal direction at an optimum viewing distance, when a parallax barrier of the 3-dimensional image display device has a tilt angle of arctan (⅓).

This is a comparative example for comparing distribution of a viewing zone formed by a 3-dimensional image display device at a position of an observer with the first embodiment, with reference to FIG. 7. FIG. 7 shows intensity distribution of each viewing zone in a horizontal direction at an optimum viewing distance of a 3-dimensional image display device which is designed so that the parallax barrier has a tilt angle of arctan (⅓), a viewpoint interval of 30 mm, nine viewpoints, and an optimum viewing distance of 1000 mm. Referring to FIG. 7, it can be found that crosstalk between viewing zones, which quantifies an input amount of image of an adjacent viewing zone at a center of the viewing zones, occurs considerably. For example, even in an ideal computer simulation, in case of a fifth viewing zone, crosstalk is seriously generated due to a fourth viewing zone and a sixth viewing zone even at the center of the viewing zone.

Second Embodiment

Figure 8A:
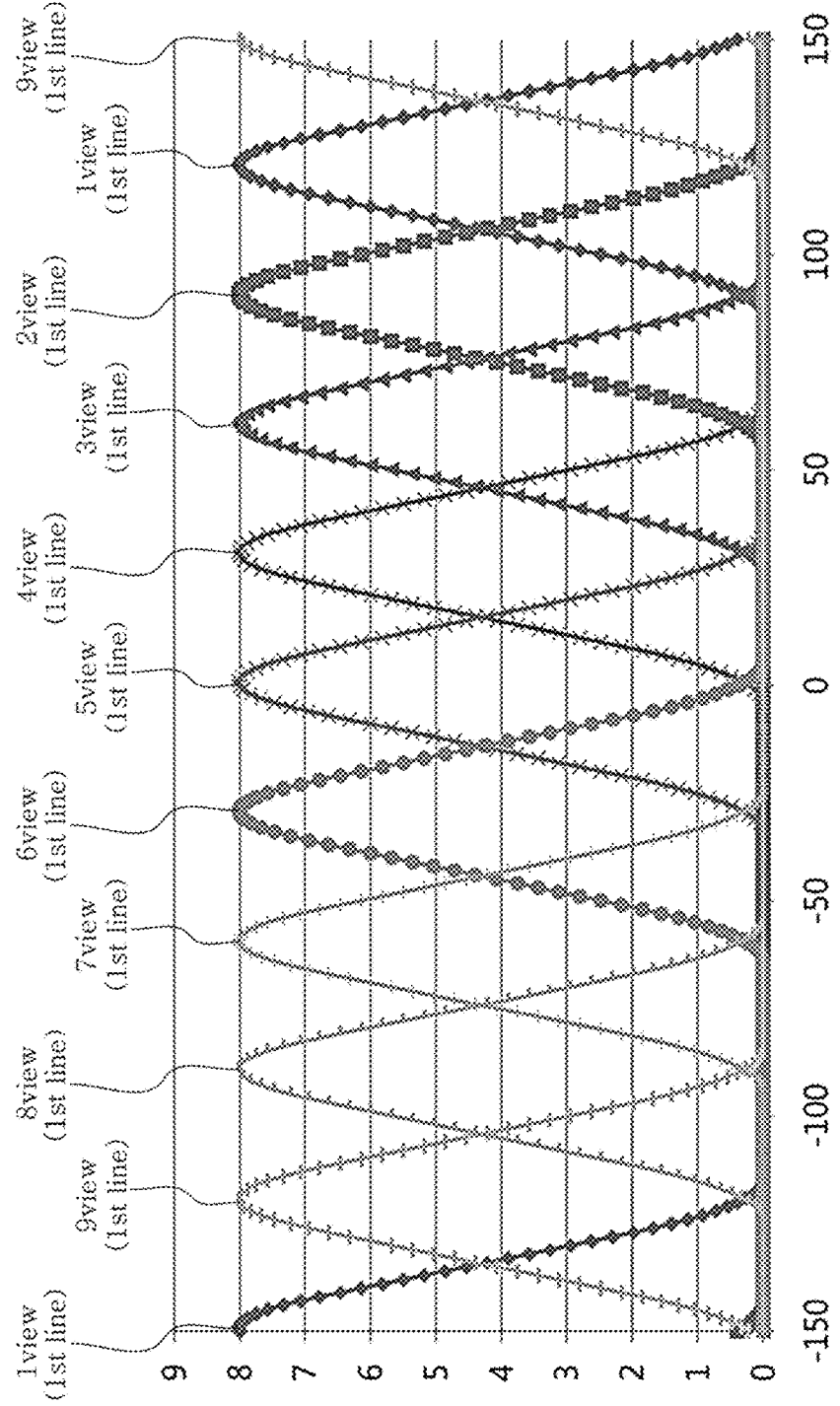
FIGS. 8A and 8B show intensity distribution of each viewing zone in a horizontal direction of the viewing zone, formed at an optimum viewing distance by a 3-dimensional image display device according to the second embodiment of the present disclosure.
Figure 8B:
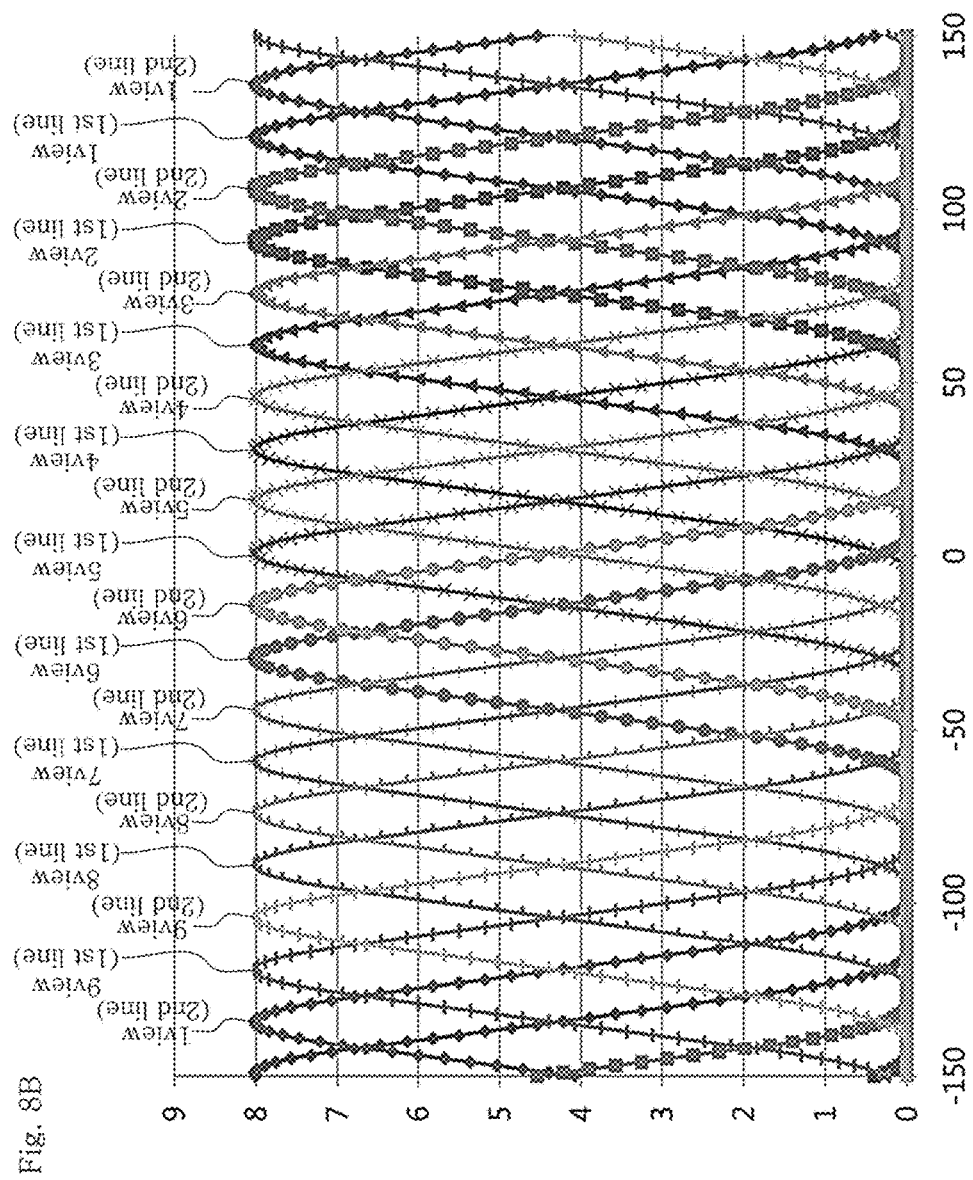

FIGS. 8A and 8B shows intensity distribution of each viewing zone in a horizontal direction, formed at an optimum viewing distance by a 3-dimensional image display device according to the second embodiment of the present disclosure. In the 3-dimensional image display device according to the second embodiment, the tilt angle of the parallax barrier and the arrangement and shape of sub-pixels are identical to those of the first embodiment. However, this device is designed to form nine viewpoints, instead of fifteen viewpoints, and the viewpoint interval (E) is set to be 30 mm and the optimum viewing distance is set to be 1000 mm.

FIG. 8A shows intensity distribution of each viewing zone in a horizontal direction, formed by the reference data row. If FIG. 8A is compared with FIG. 7, it can be found that a crosstalk is reduced in FIG. 8A.

FIG. 8B shows intensity distribution of each viewing zone, formed by two data rows included in the same cycle, together with the reference data row of FIG. 8A. An intervening viewing zones is formed at a position moving from the viewing zone formed by reference data row in a horizontal direction as much as E/(n/3) (=30 mm/2=15 mm). As a result, an interval between two adjacent viewpoints becomes 15 mm. Therefore, in comparison to the case of FIG. 7, the number of expressible viewpoints increases doubly, and a crosstalk of each data row decreases.

Third Embodiment

FIG. 9 is a diagram schematically showing a structure of a 3-dimensional image display device according to the third embodiment of the present disclosure. Here, a relation of length and width of sub-pixels and the number of viewpoints in a single data row are identical to those of the first embodiment.

However, the parallax barrier has a tilt angle of arctan (⅑). Therefore, in Equation 1, n is 9. Since n is a multiple of 3 and n=3*3, viewpoint data is distributed using successive three data rows as one cycle. The reference data row 940 forms a reference viewing zone, and data rows 950, 960 form an intervening viewing zone between the unit reference viewing zones. The order of forming viewing zones in a horizontal direction is 1-1"-1'-2-2"-2'- . . . -15-15"-15'.

Even though the third embodiment is designed to form fifteen viewpoints for each single data row, thirty viewpoints are added between fifteen viewpoints serving as references to give an effect as if forty five viewpoints are formed. In addition, in comparison to the reference viewpoint interval (E), an interval between adjacent viewpoints at an optimum viewing distance is reduced to ⅓.

Fourth Embodiment

FIGS. 10A-10C and 10D show intensity distribution of each viewing zone in a horizontal direction, formed at an optimum viewing distance by a 3-dimensional image display device according to the fourth embodiment of the present disclosure. In the 3-dimensional image display device according to the fourth embodiment, the arrangement and shape of sub-pixels, the number of viewpoints expressed with one data row, the viewpoint interval and the optimum viewing distance are identical to those of the second embodiment. However, the fourth embodiment is different from the second embodiment in the points that the parallax barrier has a tilt angle of arctan (⅑), instead of arctan (⅙), and thus three successive data rows configure one cycle.

Figure 10A:
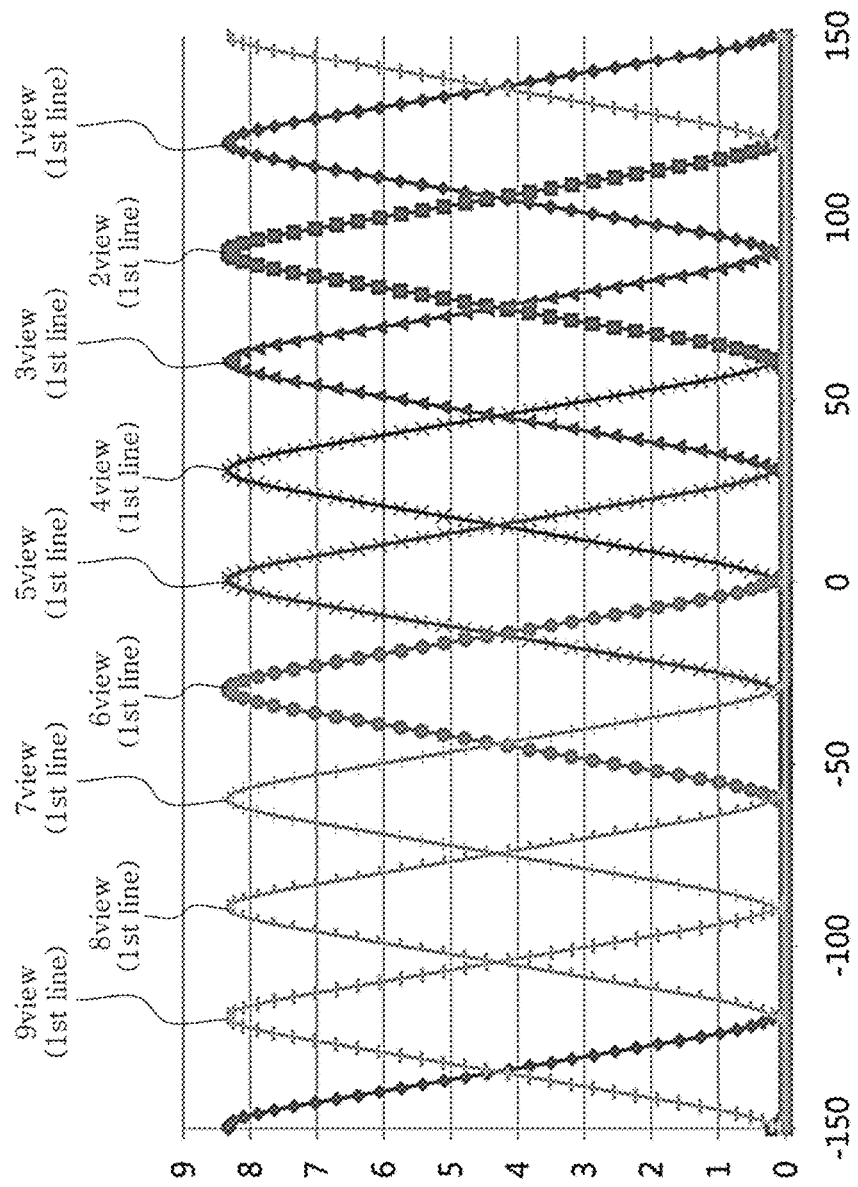
FIGS. 10A-10C and 10D show intensity distribution of each viewing zone in a horizontal direction, formed at an optimum viewing distance by a 3-dimensional image display device according to the fourth embodiment of the present disclosure.
Figure 10B:
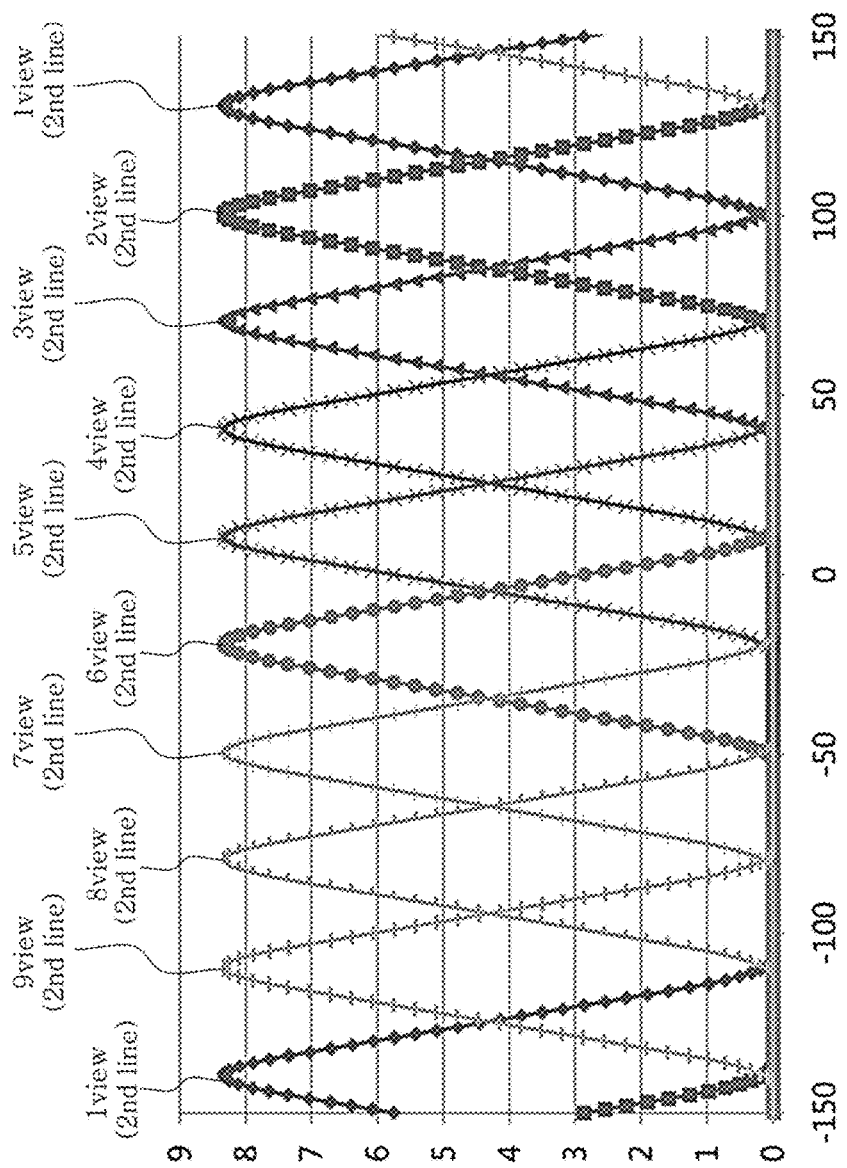
Figure 10C:
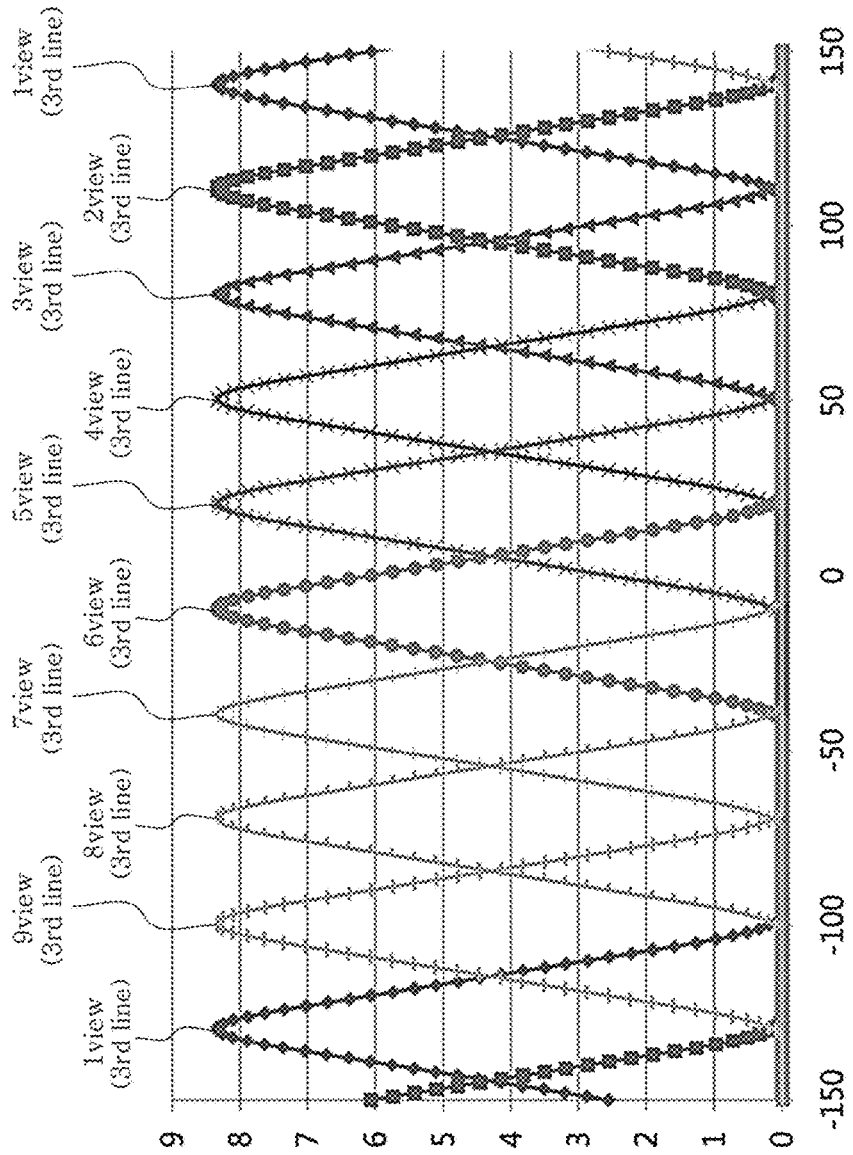

FIG. 10A-10C shows intensity distribution of each viewing zone, formed by each data row configuring one cycle. Since the parallax barrier has a tilt angle smaller than that of the second embodiment, it can be found that a crosstalk of each data row is reduced in comparison to FIG. 8A. The intensity of a viewing zone formed by the reference data row is depicted in an upper graph, and as shown in a middle graph of FIG. 10A-10C, at a position moved from the reference viewing zone in a horizontal direction as much as E/(n/3) (=30 mm/3=10 mm), a data row (a second data row) next to the reference data row forms intervening viewing zones. In addition, as shown in the lower graph, at a position moved from the intervening viewing zone formed by the second data row in a horizontal direction as much as E/(n/3), a data row (a third data row) next to the second data row forms intervening viewing zones.

Figure 10D:
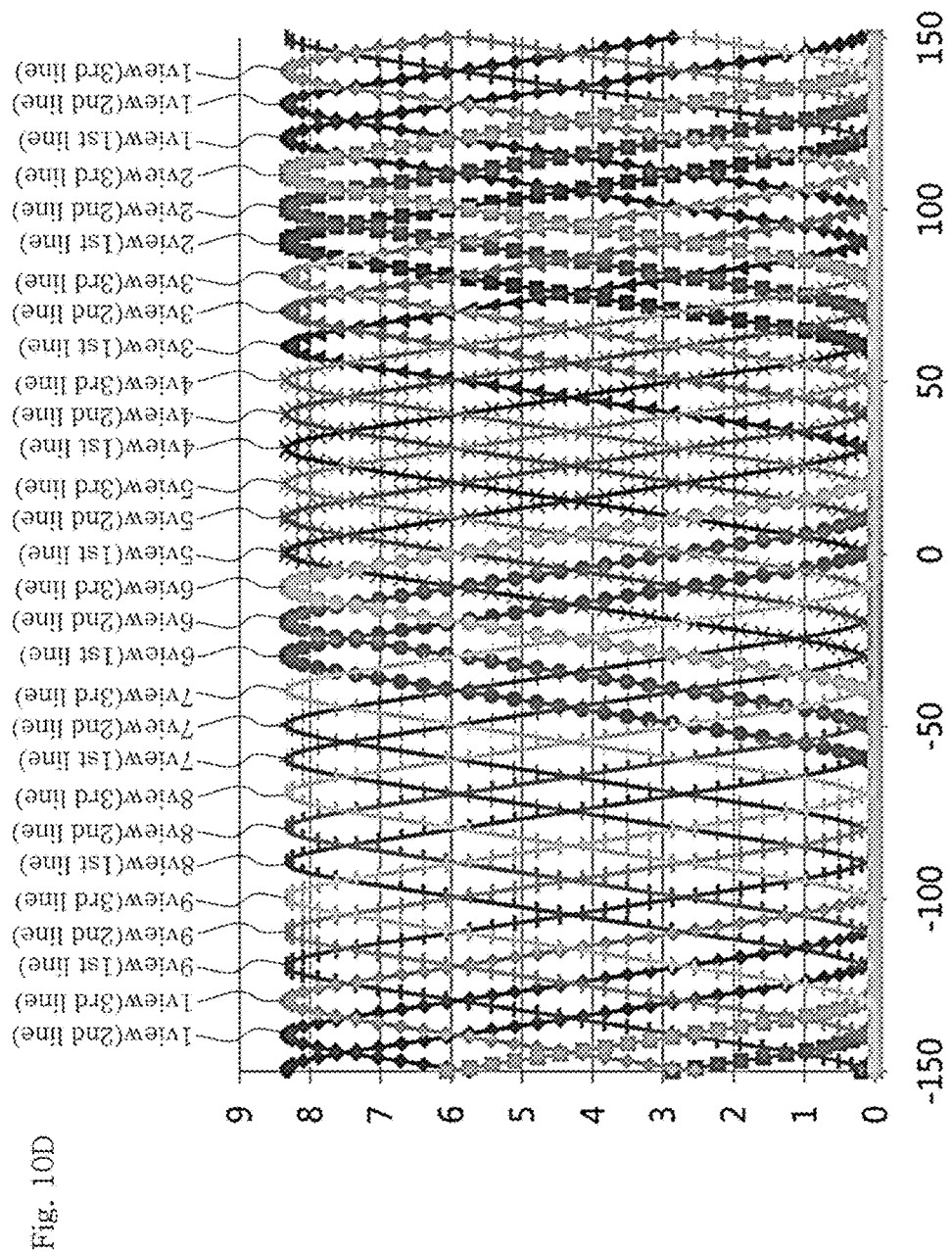

FIG. 10D shows intensity of viewing zones formed by three data row belonging to one cycle, in a single graph. An interval between finally adjacent viewpoints becomes 10 mm, and the number of expressible viewpoints increases three times in comparison to the case of FIG. 7.

Fifth Embodiment

Figure 11:
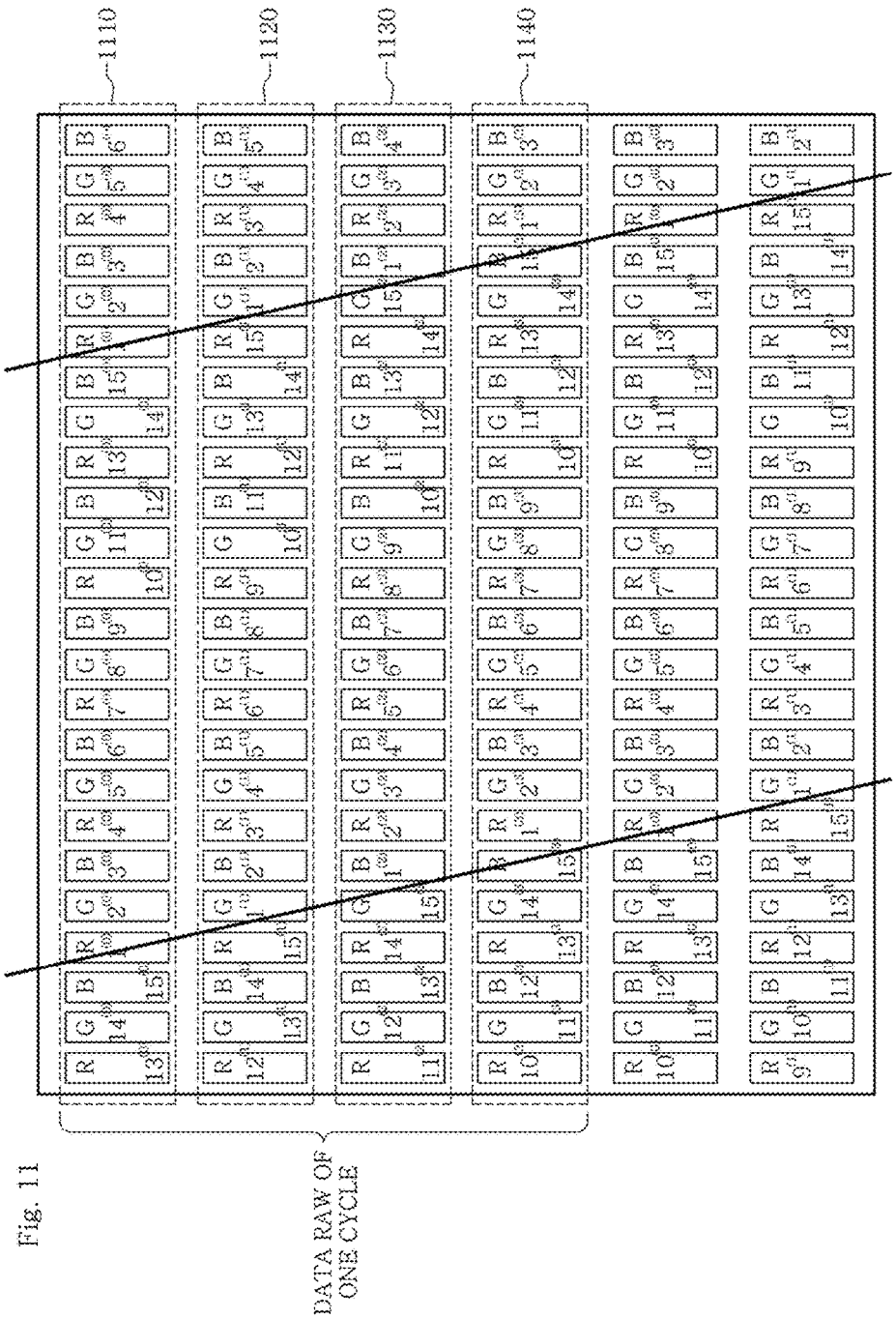
FIG. 11 is a diagram schematically showing a 3-dimensional image display device according to the fifth embodiment of the present disclosure.

FIG. 11 is a diagram schematically showing a 3-dimensional image display device according to the fifth embodiment of the present disclosure. A relation of length and width of sub-pixels and the number of viewpoints in a single data row are identical to those of the first embodiment. Sub-pixels belonging to the same row in a vertical direction have the same color.

The parallax barrier of the fifth embodiment has a tilt angle of arctan (⅙). In other words, in Equation 1, n is 4. Since n is not a multiple of 3, viewpoint data is distributed using successive four data rows 1110 to 1140 as one cycle. The data row 1110 including a sub-pixel (a red sub-pixel located at a fourth position from the left of the data row 1110 and marked with "1$^{(0)}$") closest to the opening of the parallax barrier is set as a reference data row, and the data row 1110 forms fifteen viewpoints serving as a reference at an optimum viewing distance. After that, the other data rows 1120, 1130, 1140 of the same cycle form intervening viewpoints between the reference viewpoints. The order of forming viewing zone in a horizontal direction is 1$^{(0)}$-1$^{(1)}$-1$^{(2)}$-1$^{(3)}$-2$^{(0)}$-2$^{(1)}$-2$^{(2)}$-2$^{(3)}$- . . . -15$^{(0)}$-15$^{(1)}$-15$^{(2)}$-15$^{(3)}$.

In the fifth embodiment, forty five viewpoints are added between fifteen viewpoints serving as a reference to give an effect as if sixty viewpoints are formed. In addition, in comparison to the reference viewpoint interval (E), an interval between adjacent viewpoints at an optimum viewing distance is reduced to ¼.

Different from the case where n is a multiple of 3, in the reference viewing zone, the p$^{th}$ viewing zone always has the same color (for example, the 1$^{(0)}$ viewing zone is always red). However, if an interval between adjacent viewing zones is small to have sufficiently small parallax, a color dispersion effect is not observed at each viewing zone, even though an adjacent intervening viewing zone has a color different from the reference viewing zone (for example, the 15$^{(3)}$ viewing zone is blue, and the 1$^{(1)}$ viewing zone is green). Rather, in comparison to the case where n is a multiple of 3, the number of viewpoints increases three times.

Sixth Embodiment

FIGS. 12A-12D and 12E show intensity distribution of each viewing zone in a horizontal direction, formed at an optimum viewing distance by a 3-dimensional image display device according to the sixth embodiment of the present disclosure. In the 3-dimensional image display device according to the sixth embodiment, the arrangement and shape of sub-pixels, the number of viewpoints, the viewpoint interval and the optimum viewing distance are identical to those of the second embodiment. However, the sixth embodiment is different from the second embodiment in the points that the parallax barrier has a tilt angle of arctan (¼), instead of arctan (⅙), and thus four successive data rows configure one cycle.

FIG. 12A-12D shows intensity distribution of each viewing zone, formed by each data row configuring one cycle. The uppermost graph shows a reference viewing zone formed by the reference data row, and three graphs therebelow show intervening viewing zones formed by three data rows subsequent to the reference data row. If the reference data row is a k$^{th}$ data row, a k+1$^{th}$ data row forms an intervening viewing zone at a position moved from the reference viewing zone in a horizontal direction as much as E/n (=30 mm/4=7.5 mm), a k+2$^{th}$ data row forms an intervening viewing zone at a position moved further as much as E/n, and a k+3$^{th}$ data row forms an intervening viewing zone at a position moved further as much as E/n. Since the parallax barrier has a tilt angle smaller than that of FIG. 7 and greater than that of the second embodiment, it can be found that a crosstalk of each data row is smaller than the case of FIG. 7 and greater than the second embodiment.

Figure 12A:
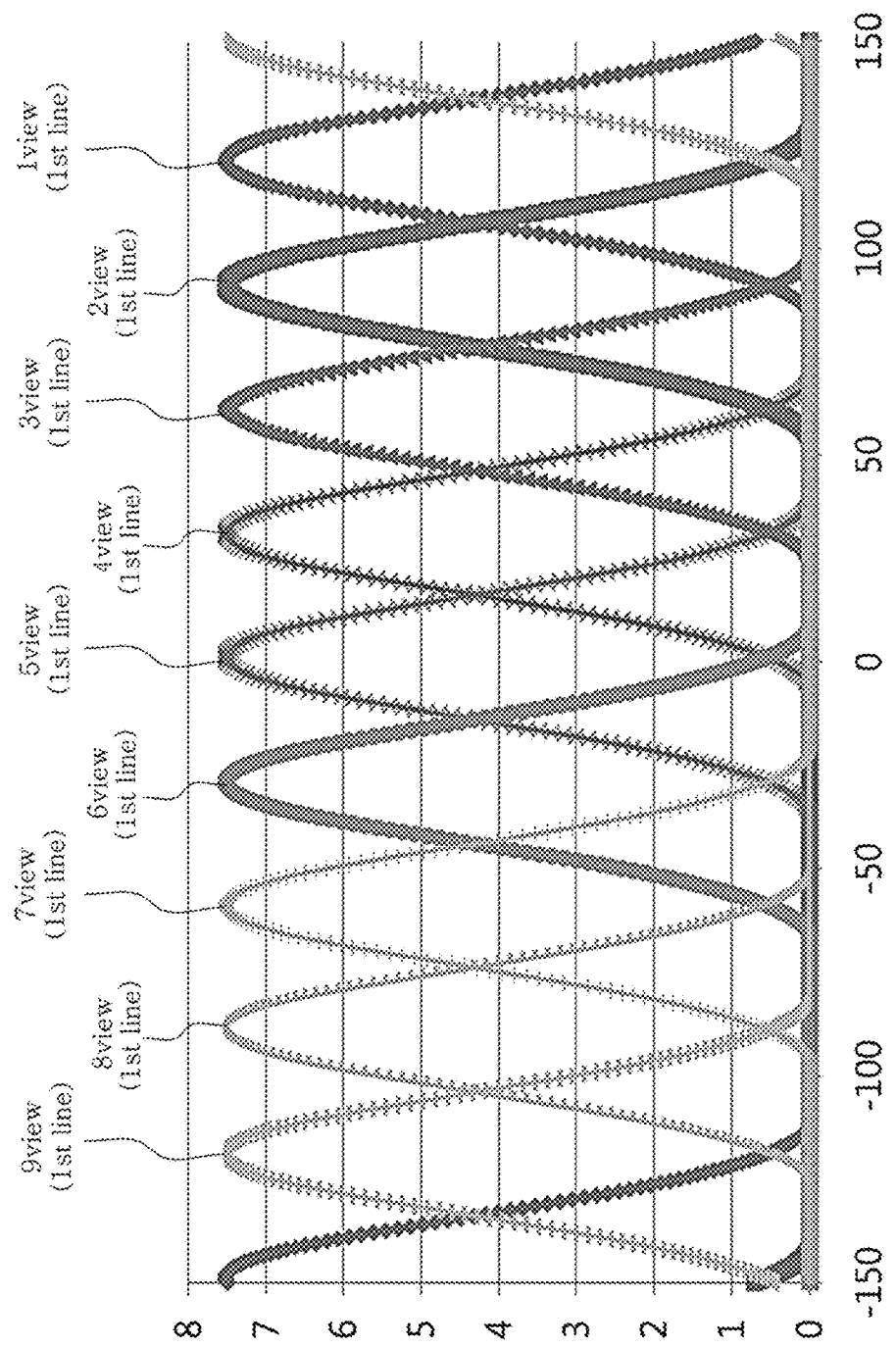
Figure 12C:
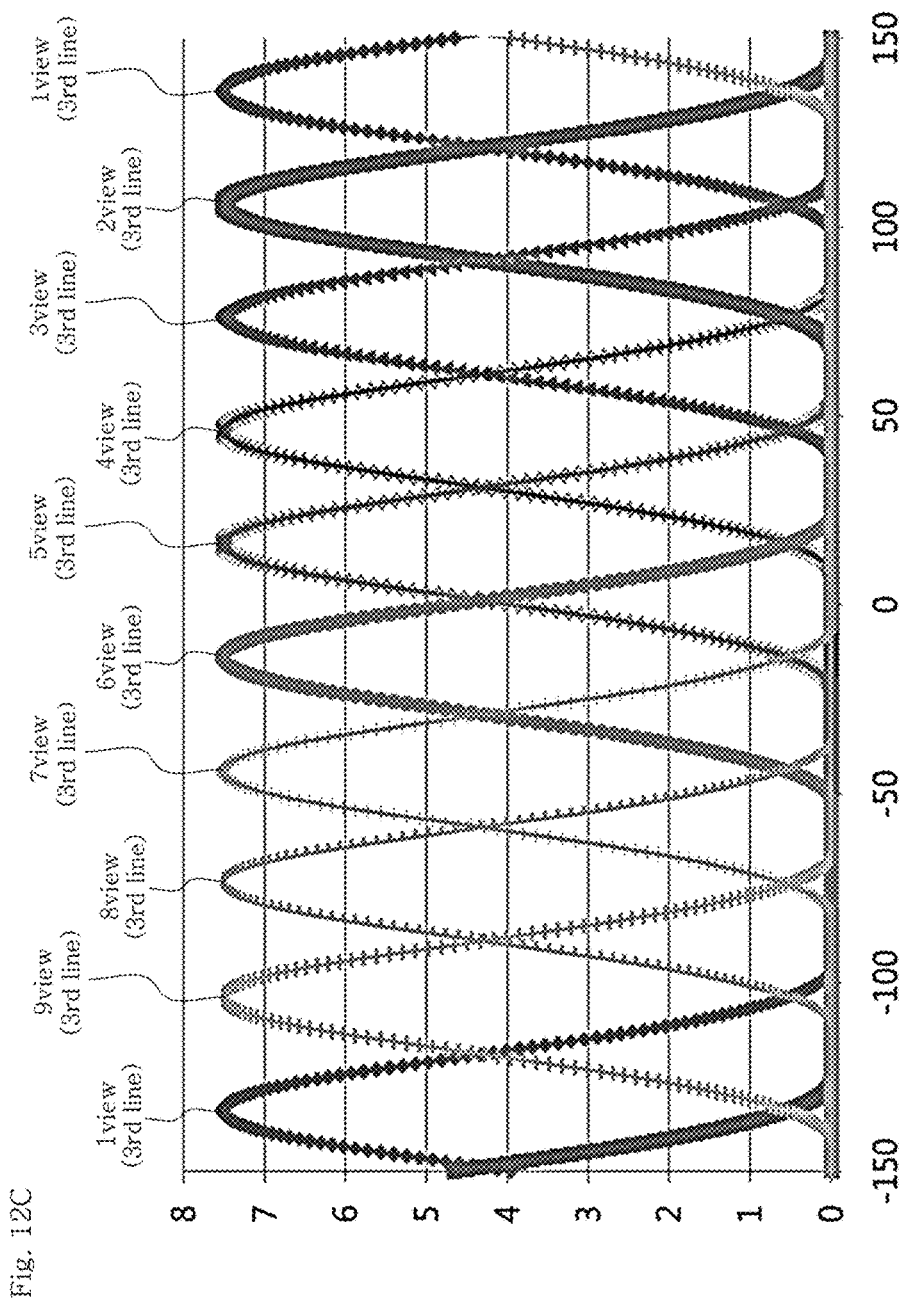
Figure 12D:
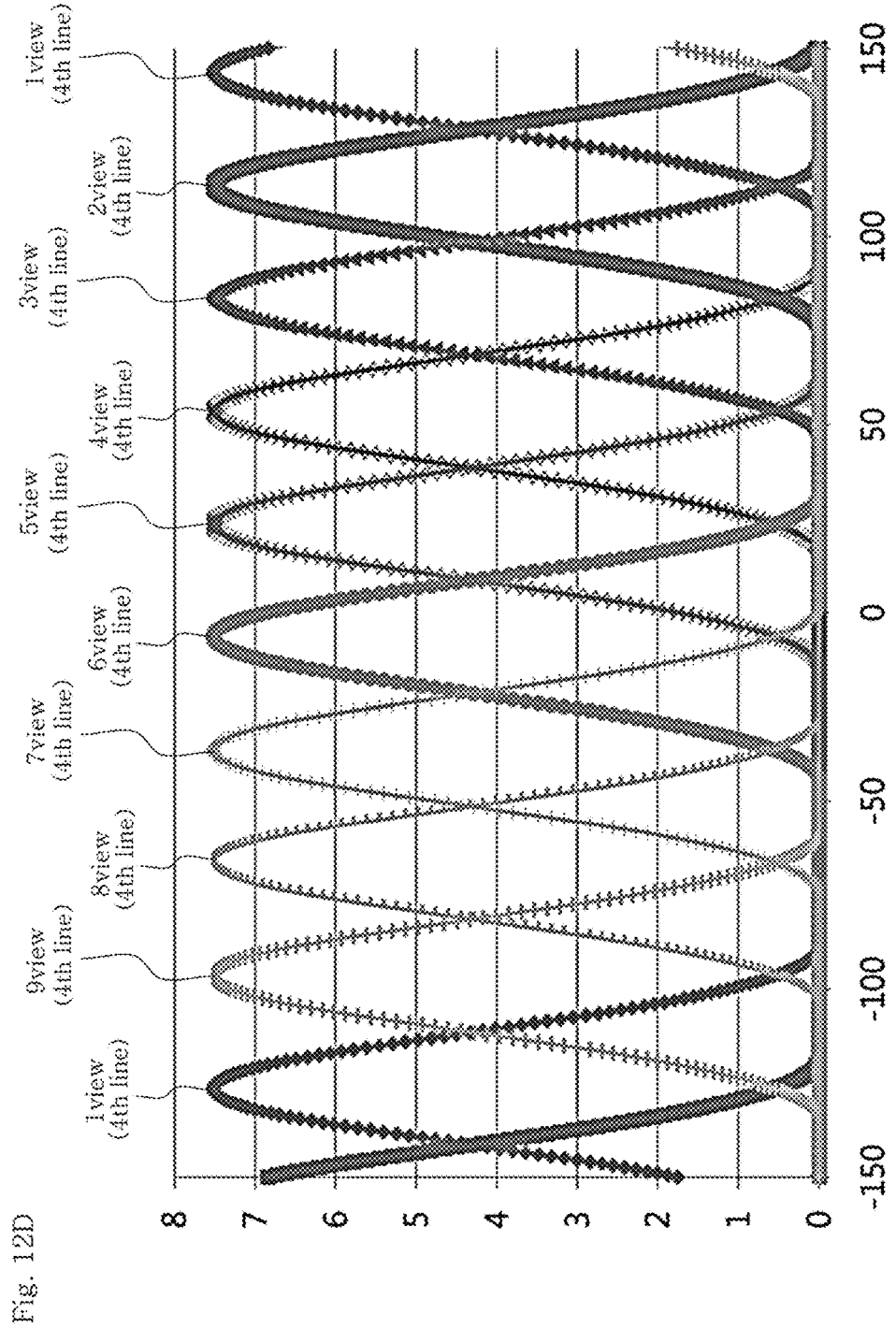
Figure 12E:
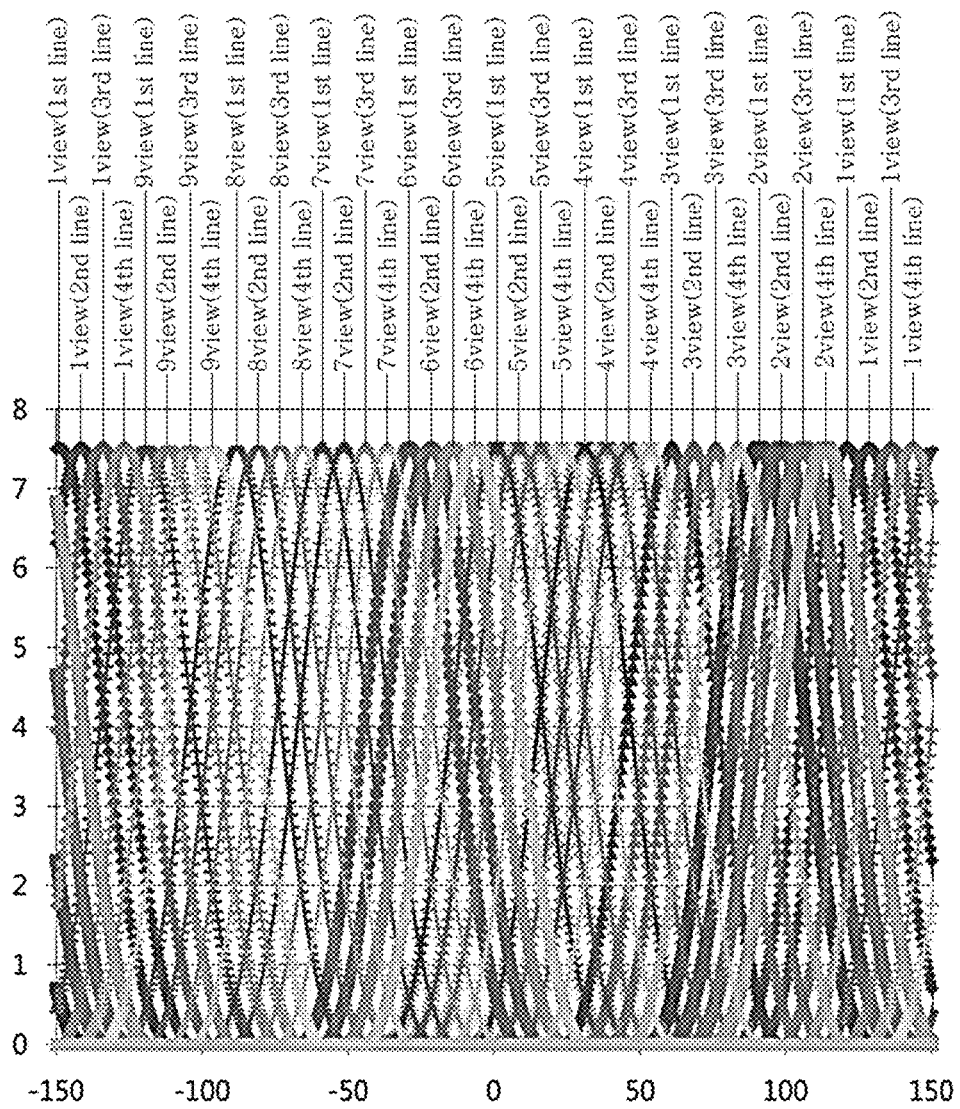

FIG. 12E shows intensity of viewing zones formed by four data row belonging to one cycle, in a single graph. An interval between finally adjacent viewpoints becomes 7.5 mm. The number of expressible viewpoints increases four times in comparison to the case of FIG. 7.

Seventh Embodiment

In Equation 1, in order to set a tilt angle more accurately in consideration of the Moire minimization condition, the tilt angle (θ) of the parallax barrier may be designed to be expressed like Equation 2 below.

$$\theta = \arctan\left(\frac{3W_h}{W_v}\frac{k}{n}\right) \qquad \text{Equation 2}$$

$W_h$ represents a width of the sub-pixel 630 in a horizontal direction, $W_v$ represents a length of the sub-pixel 630 in a vertical direction, n represents a natural number of 4 or above, and k represents a natural number of 1 or above. At this time, k/n satisfies the condition of k/n<⅓, and k/n is an irreducible fraction. n represents the degree of inclination of the parallax barrier in a vertical direction, and k represents the degree of inclination in a horizontal direction. Even in this case, similar to Equation 1 above, if n is a multiple of 3 (n=3m, m represents a natural number of 2 or above), an m number of data rows configure one cycle, and thus an N number of reference unit viewing zones are formed at a position of an observer from sub-pixels of the reference data row, an intervening viewing zone for the reference unit viewing zone is formed at the position of the observer from sub-pixels of an m−1 number of data rows to express an N*m number of viewpoints on space of the observation position. Meanwhile, if n is not a multiple of 3, an n number of data rows may configure one cycle to express an N*n number of viewpoints on space of the observation position. The embodiment satisfying Equation 1 corresponds to a case where k is 1 in this embodiment.

The present disclosure also provides a method for designing a 3-dimensional image display device. The method for designing a 3-dimensional image display device according to an embodiment may include: determining the number of viewpoints and a viewpoint interval which are to be expressed as one data row; determining a tilt angle θ of an optical plate or a backlight panel; determining a reference data row and at least one data row for forming an intervening viewing zone, based on the tilt angle θ; mapping viewpoint data with sub-pixels of the reference data row; and mapping the viewpoint data with sub-pixels of at least one data row where the intervening viewing zone is to be formed. In this embodiment, after the number of viewpoints and the viewpoint interval are determined in advance, a tilt angle of the optical plate or the backlight panel may be determined in consideration of the degree of Moire effect, and an intervening viewing zone may be formed according to the tilt angle. Therefore, when designing the device, the degree of freedom in designing the tilt angle increases, and a viewing zone may be more freely formed so that a Moire pattern is not observed.

Hereinafter, a tilt angle range of the optical plate or the backlight panel will be described in detail with reference to FIGS. 13 to 19. For convenience, it is assumed that the 3-dimensional image display device includes an optical plate, and the optical plate is a parallax barrier.

Figure 13A:
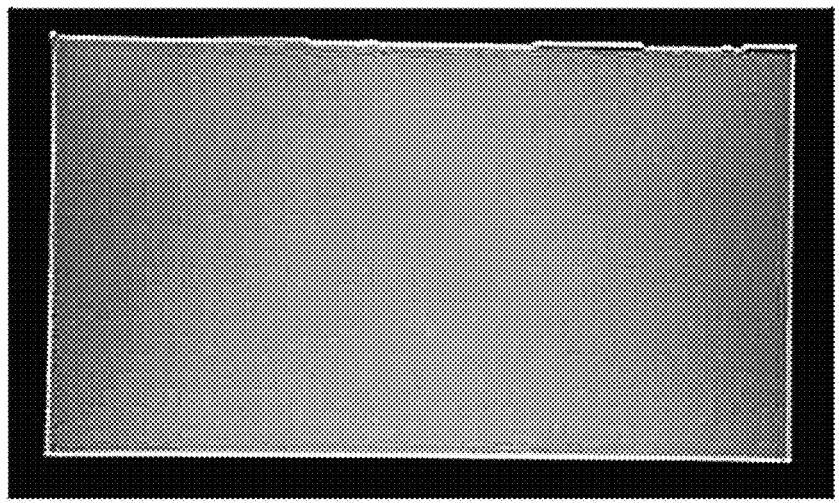
FIGS. 13A and B are a photograph showing a result of a full white test image of a multi-view 3-dimensional image display device to which a parallax barrier having a tilt angle of arctan (⅓) is applied.
Figure 13B:
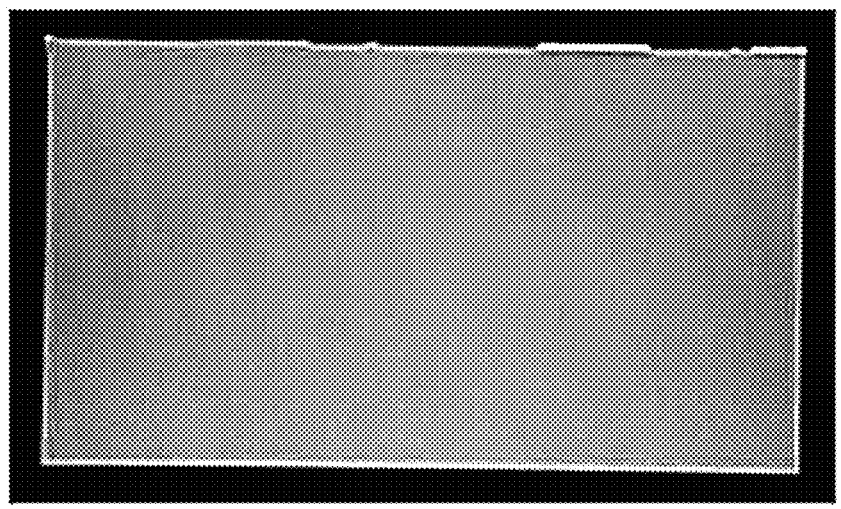

FIGS. 13A-13B are photographs showing a full white test image displayed at a multi-view 3-dimensional image display device to which a parallax barrier having a tilt angle of arctan (⅓) is applied, photographed from an observation position. At this time, a length (Wh) and a width (Wv) of the sub-pixel satisfy $3W_h=W_v$. As shown in FIG. 13A, if an observer is located at an optimum viewing distance (for example, the distance (z) between the observer and the 3-dimensional image display device is 1300 mm), a Moire pattern is not observed. However, if the observer moves in a depth direction, a Moire pattern having a different cycle is observed according to a moving distance. For example, if the observer moves to a position of z=2500 mm, a Moire pattern shown in FIG. 13B is observed, and the quality of a 3D image provided to the observer deteriorates.

Figure 14:
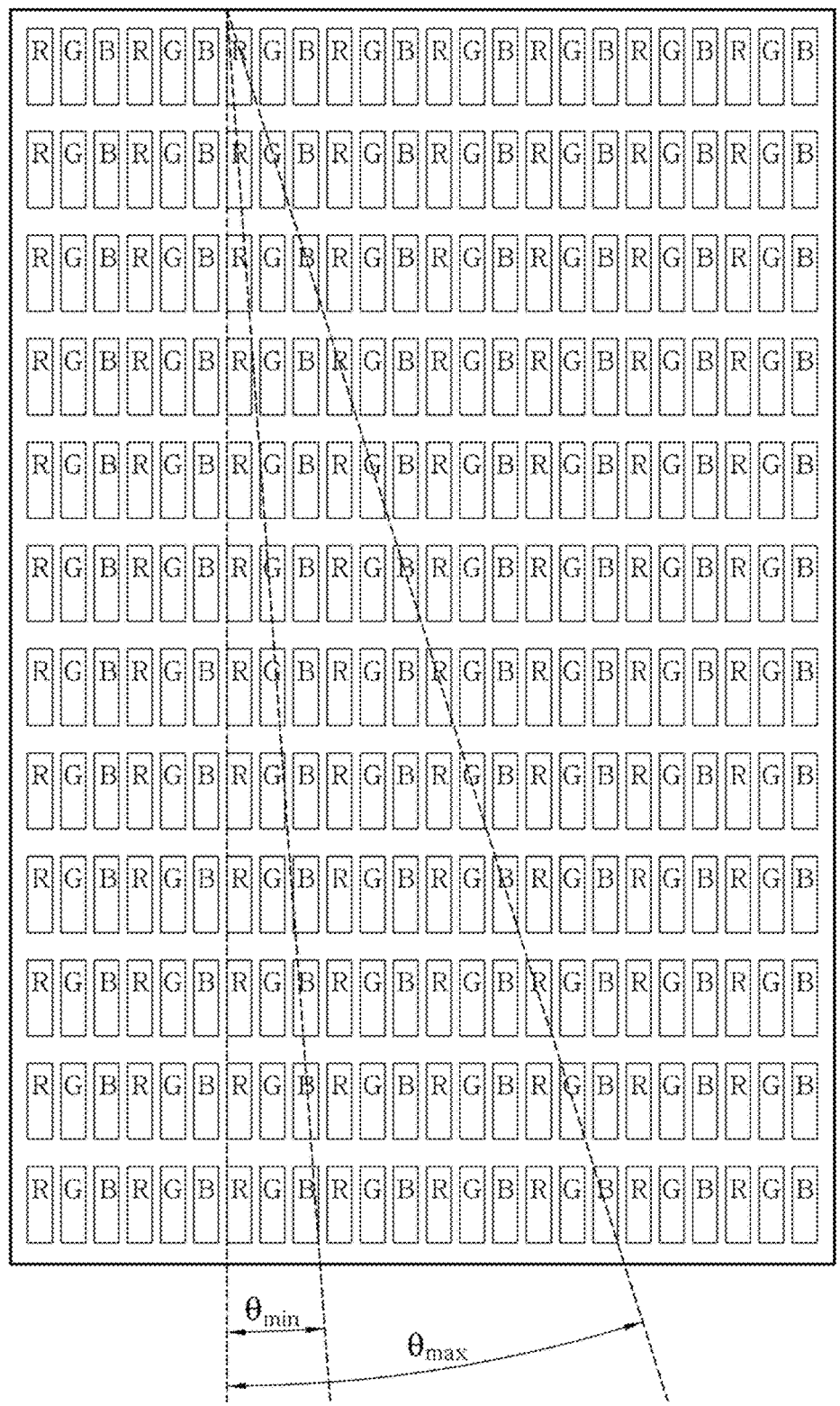
FIG. 14 is a diagram for illustrating a range of a tilt angle of a linear light source, employed at an optical plate or a backlight panel of the 3-dimensional image display device.

FIG. 14 is a diagram for illustrating a range of a tilt angle of a parallax barrier employed at the 3-dimensional image display device according to an embodiment. The parallax barrier has a tilt angle smaller than θmax and greater than θmin. θmax is as shown in Equation 3 below. At a greater tilt angle, a Moire effect occurs greatly. For example, in case of a square pixel of $3W_h=W_v$, $θ_{max}$ is ⅓.

$$\theta_{max} = \tan^{-1}\frac{W_h}{W_v} \qquad \text{Equation 3}$$

Figure 15:
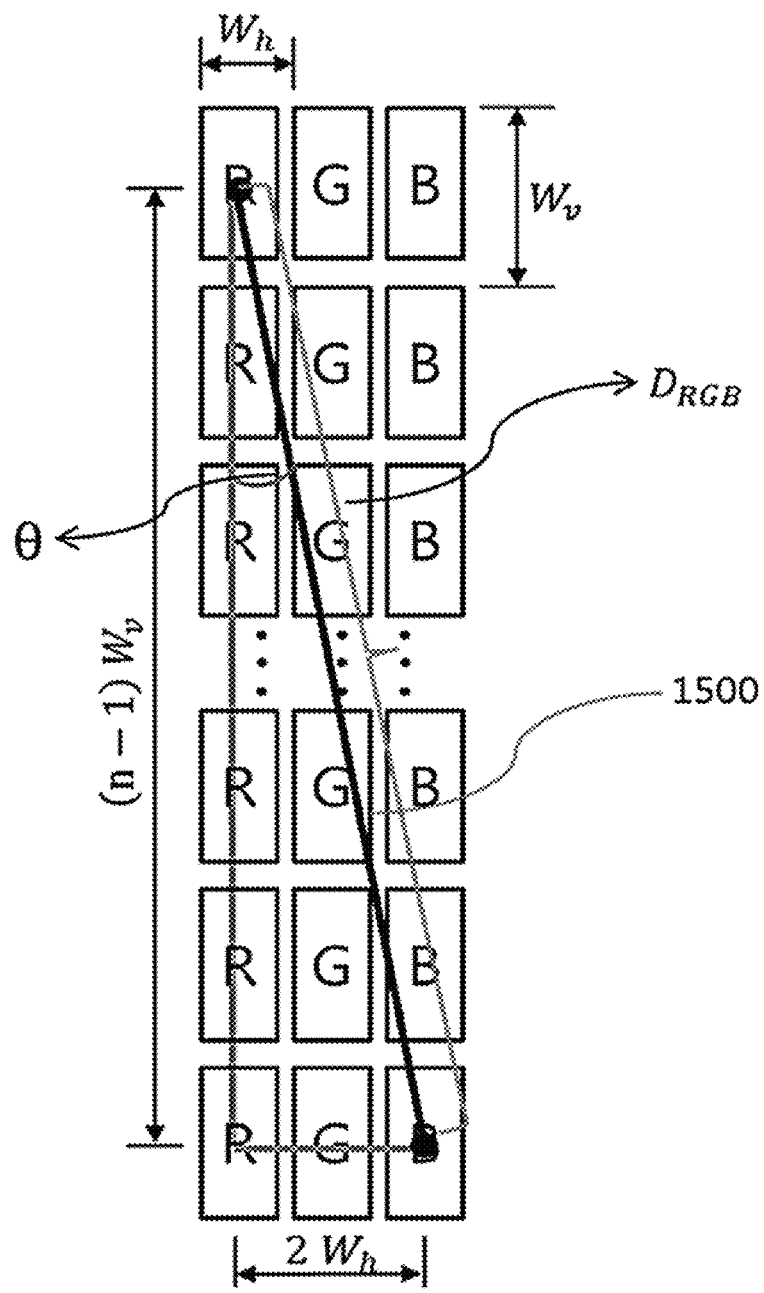
FIG. 15 is a diagram for illustrating a lower limit of the tilt angle of the linear light source of the optical plate or the backlight panel.

FIG. 15 is a diagram for illustrating a lower limit $θ_{min}$ of the tilt angle range of the parallax barrier. Referring to FIG. 15, if a center of an opening 1500 of the parallax barrier is inclined as much as θ in a vertical direction, θ is expressed like Equation 1. At this time, n corresponds to the number of pixels moving in a vertical direction when an adjacent sub-pixel closest to a sub-pixel where a single viewpoint image is disposed and displaying the same viewpoint moves in a horizontal direction as much as one pixel (three sub-pixels), and as n is greater, a slope of the parallax barrier from a vertical direction decreases. At this time, n is a natural number of 4 or above. Though not shown in the figures, this may be generalized to be expressed as Equation 2, and at this time, n corresponds to the number of pixels moving in a vertical direction, when an adjacent sub-pixel closest to a sub-pixel where a single viewpoint image is disposed and displaying the same viewpoint moves in a horizontal direction as much as k pixel (three sub-pixels). At this time, in FIG. 15, the length in a horizontal direction changes from $2W_h$ to $(3k-1)W_h$. Since the observer observes light passing through the opening 1500, the observer may recognize R, G, B sub-pixels as a fused single color (visibility), only when each of R, G, B sub-pixels recognized through the opening 1500 by the observer are not distinguished by the observer. In other words, only when a width of a RGB sub-pixel set (or, when a first color (for example, R), a second color (for example, G) and a third color (for example, B)) are successive in order, a distance between a center of the sub-pixel of the first color and a center of the sub-pixel of the third color) ($D_{RGB}$) observed through the opening 1500 is not greater than a predetermined value, they are recognized as a single color by the observer.

Figure 16:
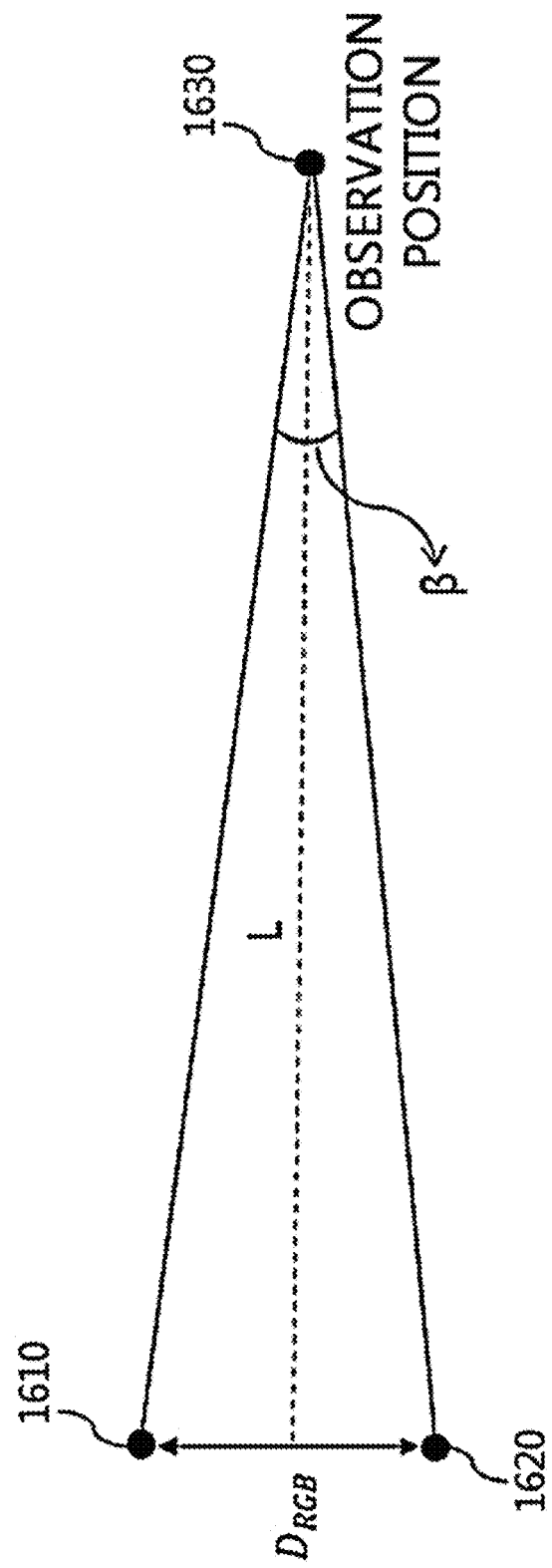
FIG. 16 is a diagram for illustrating a method for determining a minimum value of $D_{RGB}$ of FIG. 15.

FIG. 16 is a diagram for illustrating a method for determining a minimum value of $D_{RGB}$ of FIG. 15. An observer is located at a point 1630 spaced apart by a distance L from two sub-pixels 1610, 1620 separated from each other as much as a width ($D_{RGB}$) of the RGB sub-pixel set. The distance L represents a distance between the observer and the 3-dimensional image display device. In case of a 2D image display device, a distance between an observer and the image display device is generally about two times or greater and about 2.5 times or smaller in comparison to a diagonal length of the image display device, and a distance between a 3D image display device and an observer is also determined accordingly. In other words, the distance L may be about two times or greater and about 2.5 times or smaller of a diagonal direction of the 3-dimensional image display device. When the linear light source of the optical plate or the backlight panel is initially designed to have a minimum tilt angle from a vertical direction of the display panel, a minimum value ($L_{min}$) of the distance L may increase since $D_{RGB}$ increases, and if the linear light source of the optical plate or the backlight panel is designed to have a maximum tilt angle from a vertical direction of the display panel, the minimum value ($L_{min}$) decreases since $D_{RGB}$ decreases. In addition, an observer observing the 3-dimensional image should be able to observe an image at both eyes with different parallaxes, and thus a maximum value ($L_{max}$) may be determined from the condition that an effective viewpoint interval ($E_{eff}$) must be smaller than an intervening pupil distance between both eyes of the observer. In an embodiment, the distance L may be a median value ($L_{avg}$) of the maximum distance ($L_{max}$) and the minimum distance ($L_{min}$) between the observer and the 3-dimensional image display device.

After experiments with a plurality of observers in consideration of an average human eyesight, it was found that two sub-pixels 1610, 1620 may be distinguished by an observer when an angle β between a line connecting the observer and the first sub-pixel 1610 and a line connecting the observer and the second sub-pixel 1620 is 1/30° (=π/5400 radian) or greater. Considering a relation of β and $D_{RGB}$, Equation 4 below may be obtained.

$$\beta = 2\tan^{-1}\left[\frac{D_{RGB}}{2L}\right] \qquad \text{Equation 4}$$

If β=1/30° is put into Equation 4, R, G, B sub-pixels may be fused and recognized as a single color by an observer, when $D_{RGB}$ satisfies Equation 5 below.

$$D_{RGB} < 2L\tan\frac{\pi}{10800} = 0.00058L \qquad \text{Equation 5}$$

Figure 17:
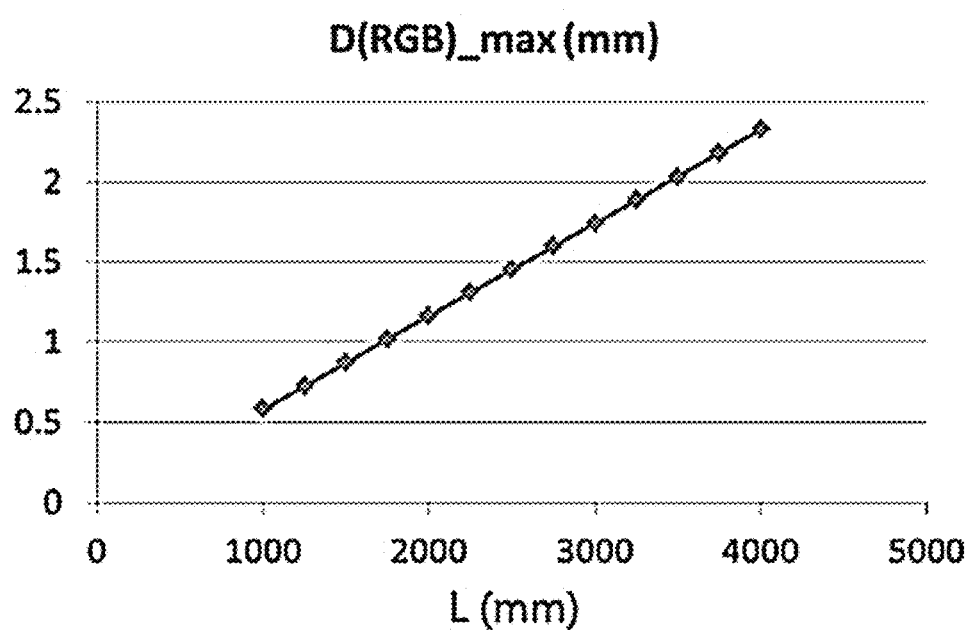
FIG. 17 is a graph showing a maximum allowable value of $D_{RGB}$ of FIG. 15 where color separation according to a distance L between the 3-dimensional image display device and an observer is not visible.

Table 1 below shows a maximum value of $D_{RGB}$ according to the distance L, and FIG. 17 is a graph expressing the same.

TABLE 1

| L (mm) | D(RGB)_max (mm) |
|---|---|
| 1000 | 0.582 |
| 1250 | 0.727 |
| 1500 | 0.873 |
| 1750 | 1.018 |
| 2000 | 1.164 |
| 2250 | 1.309 |
| 2500 | 1.454 |
| 2750 | 1.6 |
| 3000 | 1.745 |
| 3250 | 1.891 |
| 3500 | 2.036 |
| 3750 | 2.182 |
| 4000 | 2.327 |

Referring to FIG. 15 again, $D_{RGB}$ is expressed as Equation 6 below.

$$D_{RGB} = \sqrt{(n-1)^2 W_v^2 + (3k-1)^2 W_h^2}$$ Equation 6

If the upper limit of $D_{RGB}$ experimentally obtained as above is applied to Equation 6, Equation 7 below may be obtained.

$$n < 1 + \sqrt{\frac{4L^2 \tan^2 \frac{\pi}{10800} - (3k-1)^2 W_h^2}{W_v^2}}$$ Equation 7

Therefore, by putting a maximum natural number among n values satisfying Equation 7 to Equation 1, a minimum tilt angle of the opening of the parallax barrier having no color separation in a visible aspect is determined.

Figure 18:
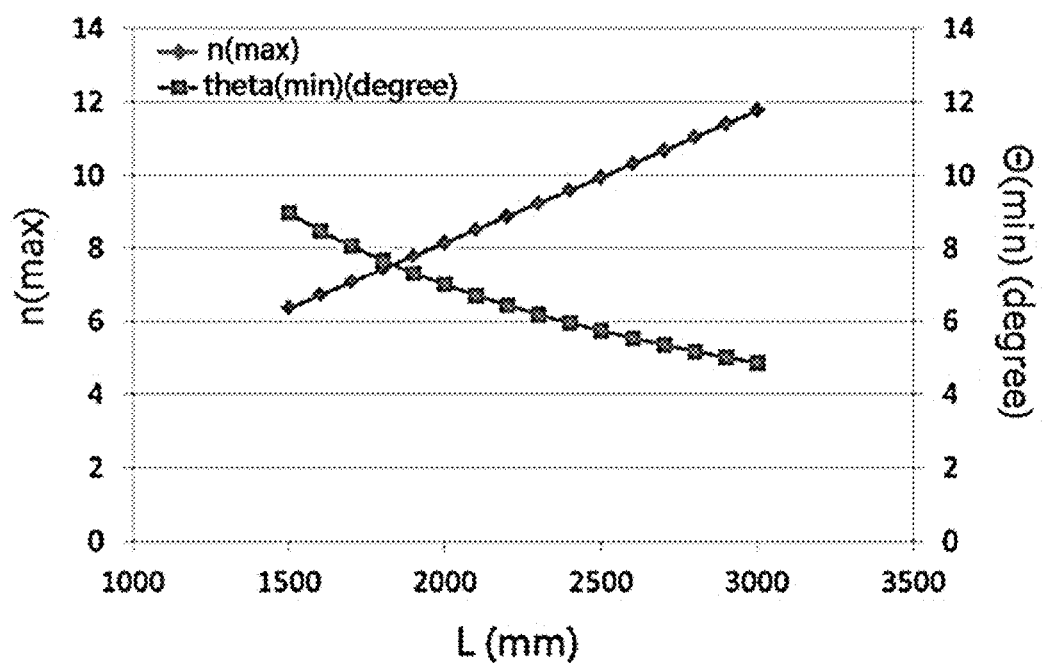
FIG. 18 is a graph showing a maximum value of a parameter (n) which determines a minimum tilt angle and a minimum tilt angle of the linear light source of the optical plate or the backlight panel according to a distance L between the 3-dimensional image display device and an observer.

Table 2 below shows an observation distance L of a 3-dimensional image display device having a square pixel structure ($W_v$=0.162 mm, $W_h$=0.054 mm), a maximum n value satisfying Equation 7 when k is 1 (a condition satisfying Equation 1), and a minimum tilt angle of the opening of the parallax barrier in the case of having the maximum n value, and FIG. 18 is a graph expressing the same.

TABLE 2

| L (mm) | n(max) | theta(min) (degree) |
|---|---|---|
| 1500 | 6.345 | 8.956 |
| 1600 | 6.707 | 8.48 |
| 1700 | 7.069 | 8.052 |
| 1800 | 7.43 | 7.665 |
| 1900 | 7.791 | 7.314 |
| 2000 | 8.151 | 6.994 |
| 2100 | 8.512 | 6.7 |
| 2200 | 8.872 | 6.431 |
| 2300 | 9.233 | 6.181 |
| 2400 | 9.593 | 5.951 |
| 2500 | 9.953 | 5.737 |
| 2600 | 10.313 | 5.538 |
| 2700 | 10.673 | 5.353 |
| 2800 | 11.033 | 5.179 |
| 2900 | 11.393 | 5.016 |
| 3000 | 11.753 | 4.863 |

Figure 19:
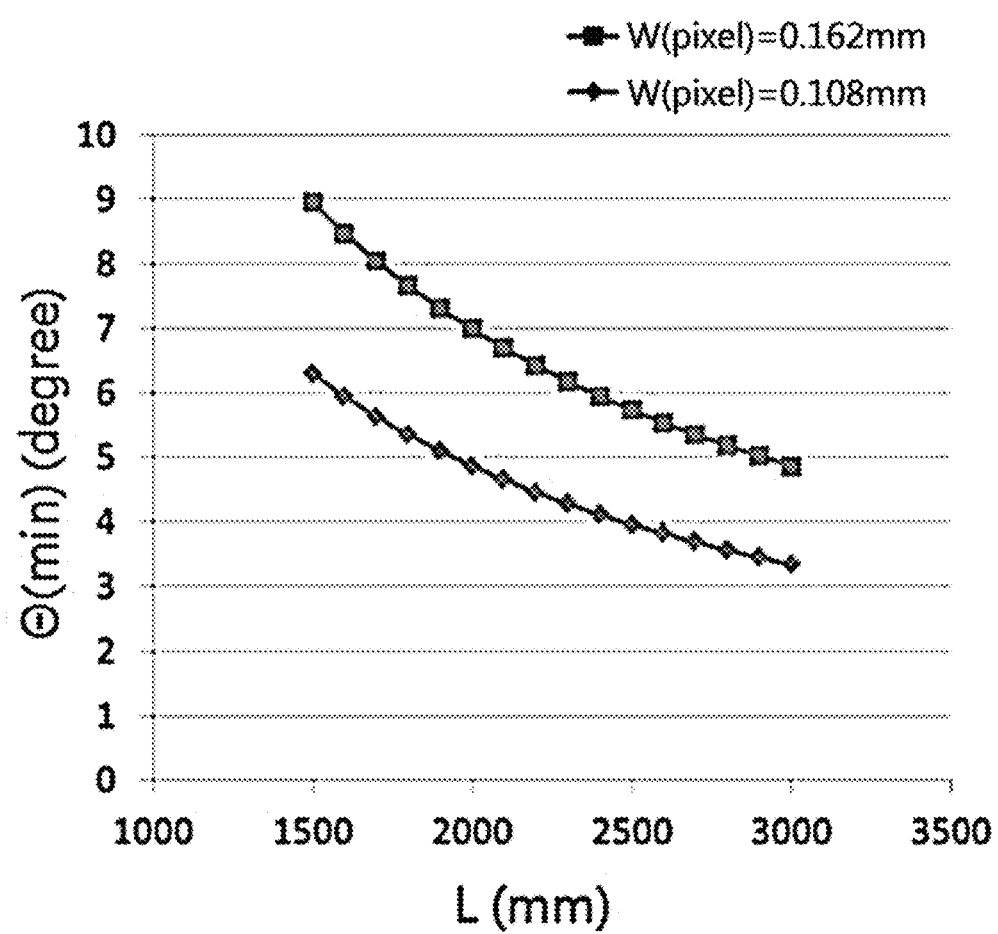
FIG. 19 is a graph showing a minimum tilt angle of the linear light source of the optical plate or the backlight panel according to a distance L between a 3-dimensional image display device using two image display panels with different pixel sizes and an observer.

Table 3 below shows an observation distance L when a sub-pixel of a square pixel structure has a length (Wv) of 0.162 mm or 0.108 mm, respectively, and a minimum tilt angle of the opening of the parallax barrier satisfying Equation 7 when k is 1 (a condition satisfying Equation 1), and FIG. 19 is a graph expressing the same.

TABLE 3

| L (mm) | W(pixel) = 0.162 mm | W(pixel) = 0.108 mm |
|---|---|---|
| 1500 | 8.956 | 6.303 |
| 1600 | 6.46 | 5.951 |
| 1700 | 8.052 | 5.636 |
| 1800 | 7.665 | 5.353 |
| 1900 | 7.314 | 5.096 |
| 2000 | 6.994 | 4.863 |
| 2100 | 6.7 | 4.651 |
| 2200 | 6.431 | 4.456 |
| 2300 | 6.181 | 4.277 |
| 2400 | 5.951 | 4.112 |
| 2500 | 5.737 | 3.959 |
| 2600 | 5.538 | 3.817 |
| 2700 | 5.353 | 3.585 |
| 2800 | 5.179 | 3.561 |
| 2900 | 5.016 | 3.446 |
| 3000 | 4.863 | 3.388 |

Referring to Table 3 and FIG. 19, it can be found that as the image display panel has a greater density, namely as the pixel has a smaller size, color separation does not occur at a smaller tilt angle of the parallax barrier. Therefore, it can be understood that the above is advantageous in reducing crosstalk.

Hereinafter, a condition for forming a 3D viewing zone of one data row by the 3-dimensional image display device according to the embodiments of the present disclosure will be described with reference to FIGS. 20 to 22. Even though it is illustrated that the 3-dimensional image display device includes a parallax barrier, the features applied to the opening of the parallax barrier may also be identically applied to the light transmission region of the optical plate and the light emission unit of the backlight panel.

Figure 20:
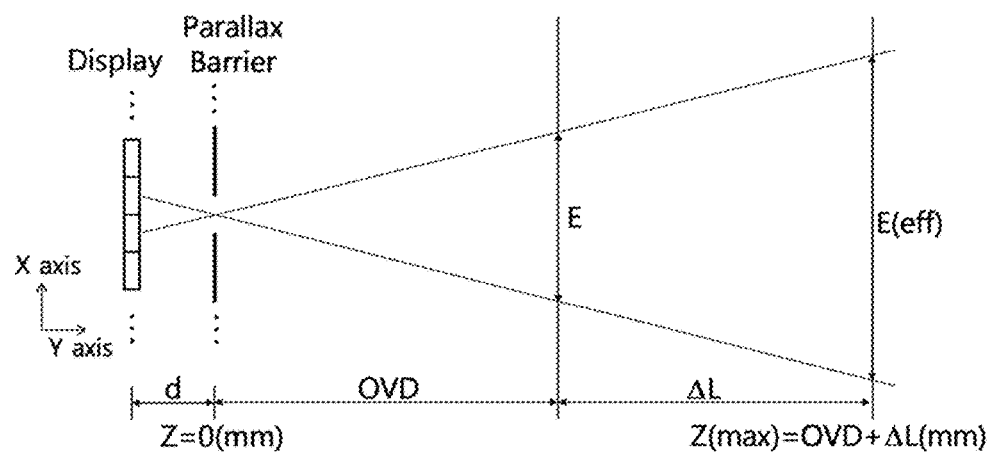
FIG. 20 is a diagram for illustrating a viewpoint interval condition of a 3-dimensional image display device according to an embodiment of the present disclosure.

FIG. 20 is a diagram for illustrating a viewpoint interval condition of a 3-dimensional image display device according to an embodiment of the present disclosure. Referring to FIG. 20, in the 3-dimensional image display device according an embodiment, a distance between two sub-pixels having adjacent viewpoint images and a distance (d) between a display panel and a parallax barrier are determined so that an interval (E) between viewpoints formed at an optimum viewing distance by image information mapped with two adjacent sub-pixels is smaller than an intervening pupil distance (IPD) of an observer. If the viewpoint interval at the optimum viewing distance is greater than the intervening pupil distance, a viewpoint image provided from one pixel is recognized by both eyes of the observer simultaneously, and thus the observer may not see the image with separated parallax properly.

In addition, in an embodiment, an effective viewpoint interval ($E_{eff}$) at a maximum observation distance (z(max) =OVD+ΔL) in a depth direction (z-axis direction) after the optimum viewing distance is smaller than the intervening pupil distance. If the effective viewpoint interval is smaller than the intervening pupil distance, the viewpoint interval at the optimum viewing distance is also smaller than the intervening pupil distance. At this time, the maximum observation range means a position in a depth direction where an effective viewpoint interval ($E_{eff}$) between two unit viewing zones through a single opening of the parallax barrier, from two adjacent sub-pixels giving adjacent viewpoint images, becomes identical to the intervening pupil distance. The effective viewpoint interval is expressed as Equation 8 below.

$$E_{eff} = E\left(1 + \frac{\Delta L}{OVD}\right)$$ Equation 8

If two sub-pixels closest to each other, mapped with the same viewpoint in one data row, are watched discontinuously by an observer in a visible aspect, the observer feels that the quality of the 3D image deteriorates. Therefore, a distance between two sub-pixels closest to each other, mapped with the same viewpoint in one data row, namely a horizontal cycle (T) should be designed to have a certain value or below so that a high-quality clear 3-dimensional image maybe observed.

Figure 21:
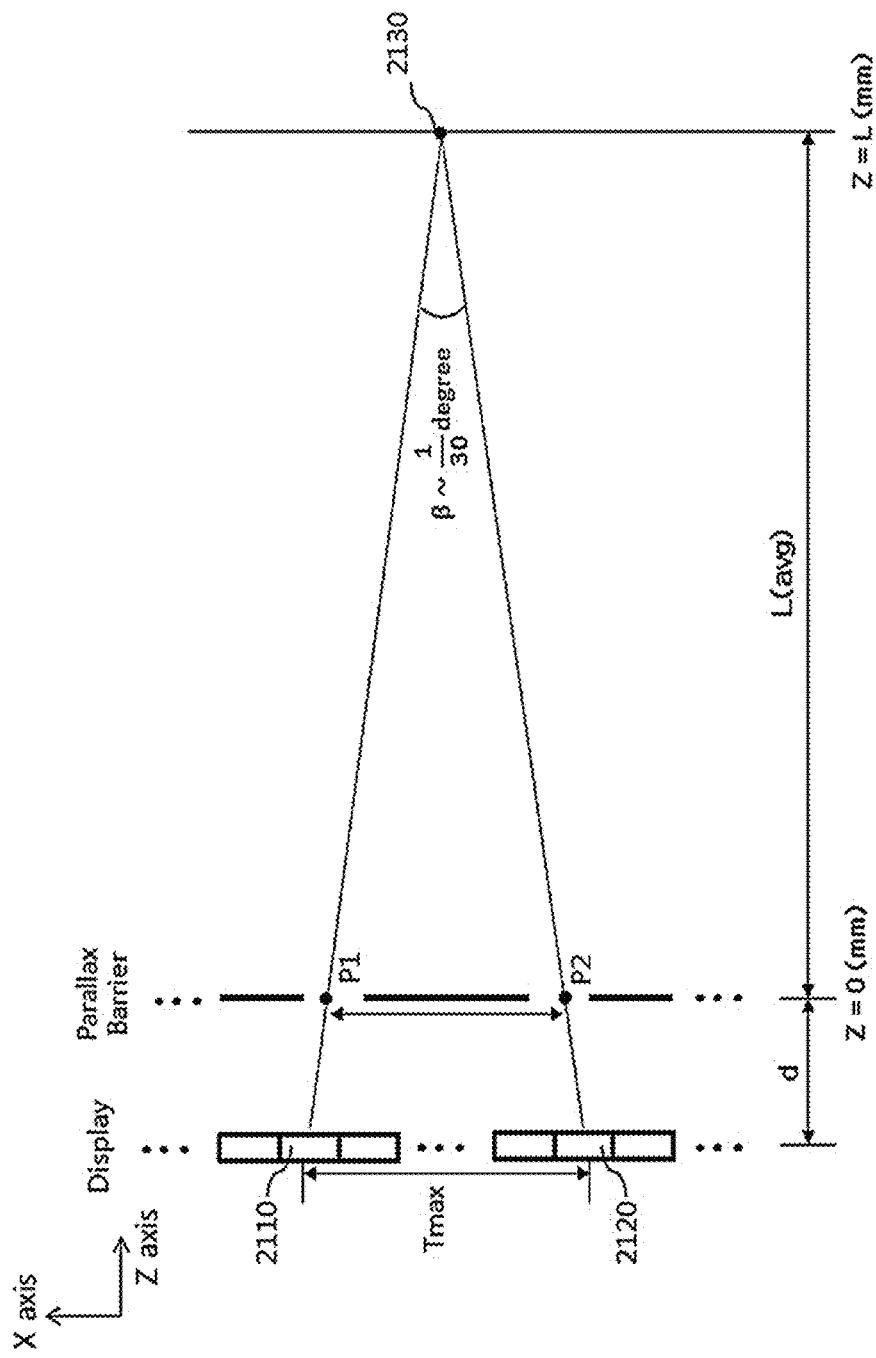
FIG. 21 is a diagram for illustrating a maximum horizontal cycle in one data row at an image display panel of the 3-dimensional image display device according to an embodiment of the present disclosure.

FIG. 21 is a diagram for illustrating a maximum horizontal cycle ($T_{max}$) in one data row at the image display panel of the 3-dimensional image display device according to an embodiment of the present disclosure. At this time, the maximum horizontal cycle means a maximum distance where a distance between two sub-pixels closest to each other, mapped with the same viewpoint in one data row, is not watched discontinuously. Referring to FIG. 21, a sub-pixel 2110 and a sub-pixel 2120 are mapped with image data for the same viewpoint. According to the experiment result of FIG. 16, an angle between a line connecting an eye 2130 of an observer and the sub-pixel 2110 and a line connecting the eye 2130 and the sub-pixel 2120 should be smaller than $\frac{1}{30}°$. For this, in an embodiment, the maximum horizontal cycle ($T_{max}$) may satisfy Equation 9 below.

$$T_{max} = 2L_{avg} \tan\frac{\beta}{2} \sim 0.000582 L_{avg} \qquad \text{Equation 9}$$

The horizontal cycle (T) may also be expressed as a horizontal distance (namely, a cycle of the light transmission region) between two adjacent light transmission regions or a horizontal distance (namely, a cycle of the light emission unit) between two light emission units of the backlight panel. Therefore, if a width of the sub-pixel in a horizontal direction is given, a maximum number of viewpoints expressible with one data row may be determined as long as the cycle of the light transmission region is determined based on Equation 9.

For example, in case of 28-inch UHD (Ultra High Definition) monitor, a sub-pixel has a horizontal width ($W_h$) of 0.054 mm. If this is applied to Equation 9, since a maximum number of unit sub-pixels (namely, a maximum number of viewpoints of the reference viewing zone) forming a 3D reference viewing zone within one data row is a maximum natural number smaller than or equal to $T_{max}/W_h$, the maximum number of unit sub-pixels is calculated to be about 27 if the average observation distance ($L_{avg}$) from the 3D display is given to be 2500 mm. In another example, in case of a 31-inch 2560*1600 monitor, since a sub-pixel has a horizontal width ($W_h$) of 0.0835 mm, if the average observation distance ($L_{avg}$) from the 3D display is given to be 2500 mm, a maximum number of viewpoints of the reference viewing zone is calculated as about 17.

Figure 22:
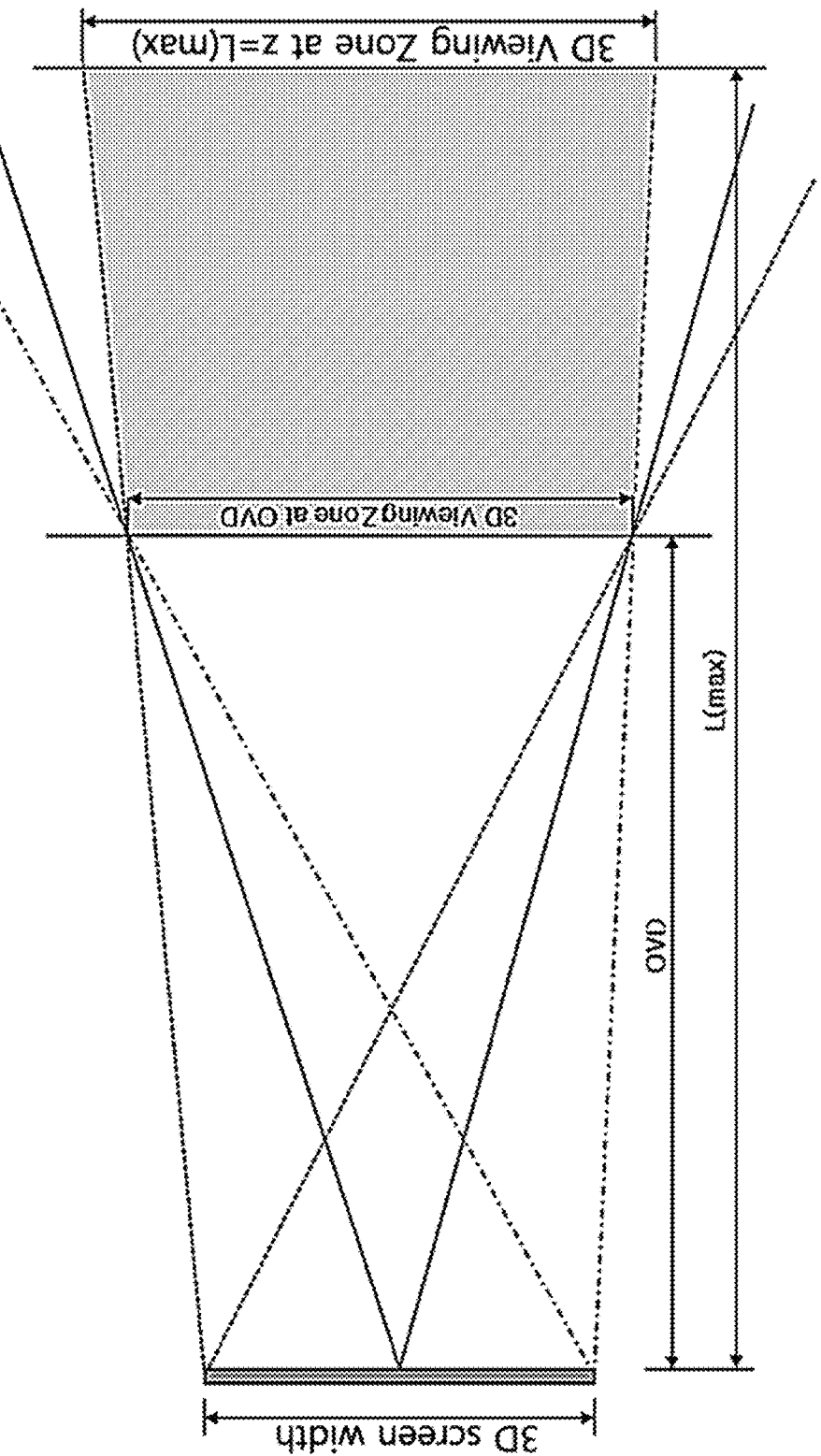
FIG. 22 is a diagram for illustrating a size condition of a 3D viewing zone and an observation range where a 3-dimensional image is visible, at an optimum viewing distance formed from the image display panel of the 3-dimensional image display device according to an embodiment of the present disclosure.

FIG. 22 is a diagram for illustrating a size condition of a 3D viewing zone at an optimum viewing distance formed through a single opening of the parallax barrier. Referring to FIG. 22, in an embodiment, a width (namely, a value obtained by multiplying a width of a unit viewing zone at an optimum viewing distance by the number of viewpoints expressible with one data row) of a central viewing zone (or, a 3D viewing zone) at the optimum viewing distance including an N number of viewpoints is greater than a width of the image display panel in a horizontal direction. By doing so, a region from the optimum viewing distance to a maximum observation distance, where a 3D image is observable, may be maximized from the entire region of the image display panel.

Meanwhile, in an embodiment, since the effective viewpoint interval expressed as Equation 8 at the maximum observation distance is smaller than the intervening pupil distance of the observer, the maximum viewpoint interval (Emax) allowable at the optimum viewing distance may be expressed as Equation 10 below.

$$E_{max} = \frac{OVD * IPD}{L(max)} \qquad \text{Equation 10}$$

For example, in case of a 28-inch UHD monitor where a width of the monitor in a horizontal direction is 640 mm, an optimum viewing distance is 1000 mm, a maximum observation distance (L(max)) of an observer in a depth direction is 3000 mm, since it is known that an average intervening pupil distance of a human is about 65 mm, the maximum viewpoint interval ($E_{max}$) at the optimum viewing distance is 21.7 mm. Therefore, the number of sub-pixels associating with the reference viewing zone should be 30 or more in order that the size of the 3D viewing zone at the optimum viewing distance is greater than the width of the image display panel in a horizontal direction. In other words, when the device is designed with the maximum viewpoint interval at the optimum viewing distance, 30 or more unit reference viewing zones should be formed with one data row.

As another example, in case of a 28-inch UHD monitor where a width of the monitor in a horizontal direction is 640 mm, an optimum viewing distance is 1000 mm, and a maximum observation distance (L(max)) of an observer in a depth direction is 2000 mm, the maximum viewpoint interval (Emax) at the optimum viewing distance is 32.5 mm, and the number of sub-pixels associating with the reference viewing zone should be 20 or more. In other words, when the device is designed with the maximum viewpoint interval at the optimum viewing distance, 20 or more unit reference viewing zones should be formed with one data row.

Figure 23:
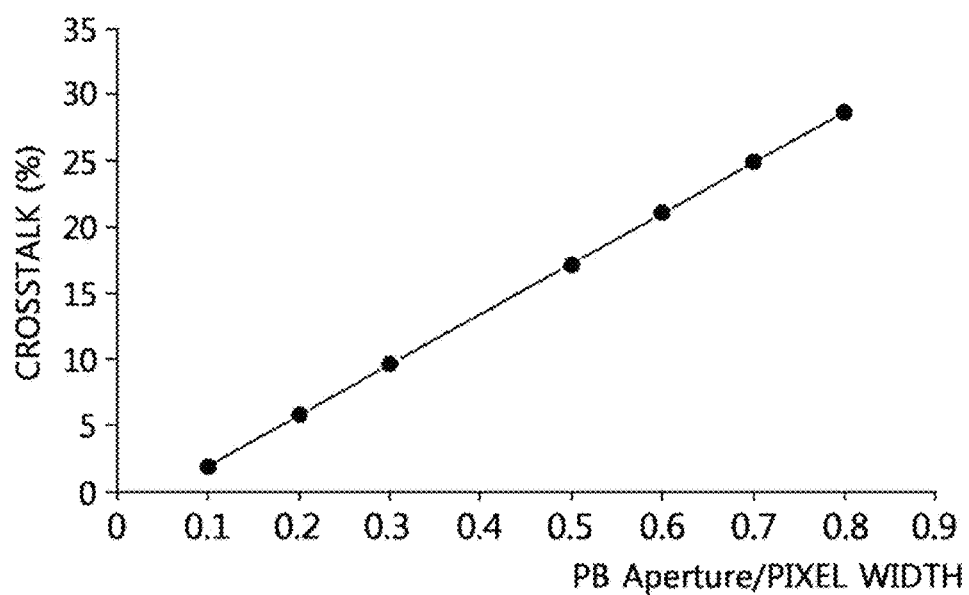
FIG. 23 is a graph showing a crosstalk according to an PB Aperture of a parallax barrier or a width of a light emission unit of a backlight panel in a horizontal direction in comparison to a width of one sub-pixel in the horizontal direction.

FIG. 23 is a graph showing a crosstalk according to a width of the opening of the parallax barrier at the observation range defined in FIG. 22, in comparison to a width of one sub-pixel in a horizontal direction. In an embodiment, the width of the opening may be smaller than or equal to 30% of the width of the sub-pixel (not including 0%). Table 4 below shows an average crosstalk at the observation range defined in FIG. 22, according to a line width of a vertical linear light source of the backlight panel in comparison to the width of the sub-pixel, and FIG. 23 is a graph showing the same.

TABLE 4

| Line width (mm) of a linear light source | Line width/ pixel width | Avg CT (%) |
| --- | --- | --- |
| 0.08 | 0.8 | 28.64 |
| 0.07 | 0.7 | 24.87 |
| 0.06 | 0.6 | 21.07 |
| 0.05 | 0.5 | 17.06 |
| 0.04 | 0.3 | 9.55 |
| 0.02 | 0.2 | 5.78 |
| 0.01 | 0.1 | 1.85 |

Referring to Table 4 and FIG. 23, it can be found that if a line width of the linear light source is 30% or below of the width of the sub-pixel, average crosstalk in the designed observation range where a 3D image is observable is reduced into less than 10%.

Figure 24:
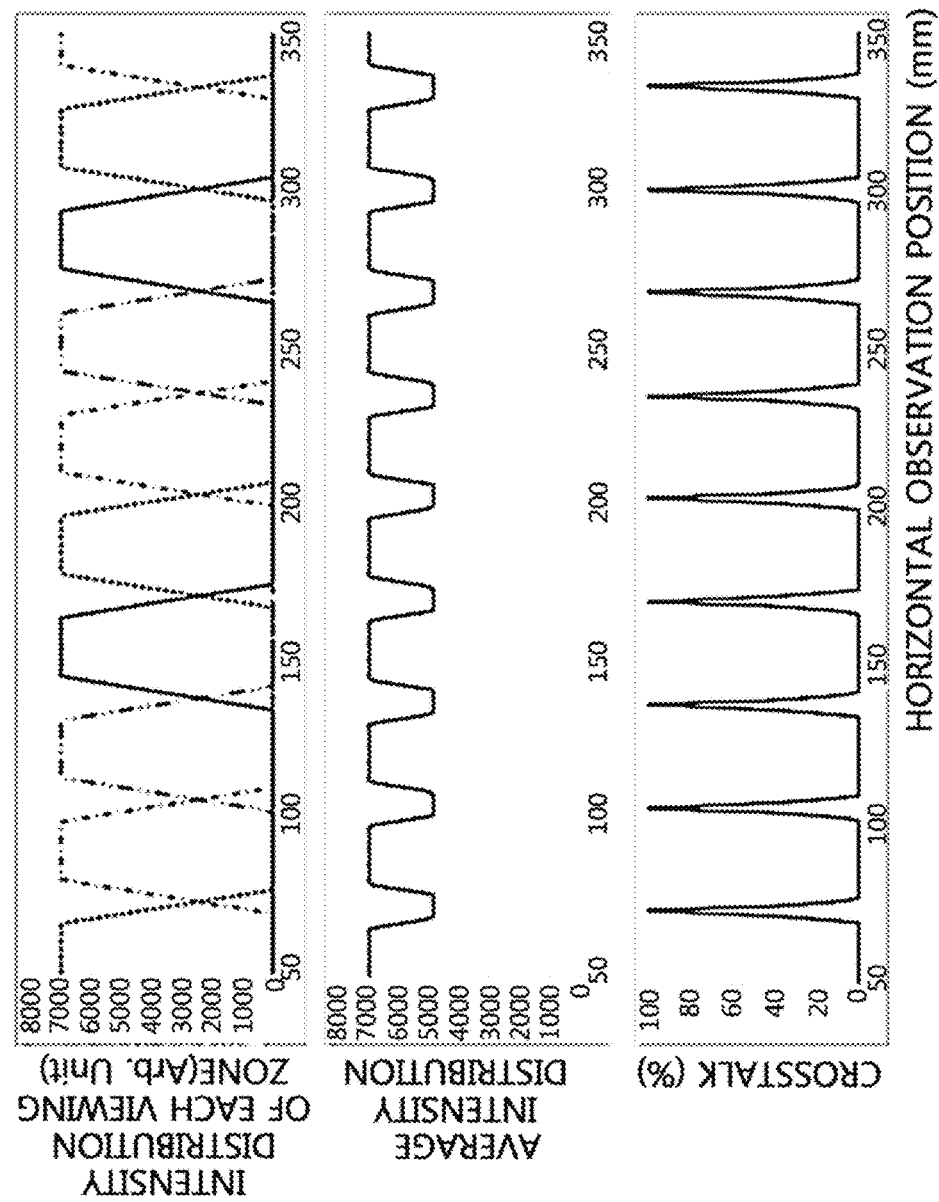
FIG. 24 shows an example of intensity distribution, average intensity distribution and crosstalk of each viewing zone according to a horizontal position at an observation distance of a 4-viewpoint 3-dimensional image display device which forms a common viewing zone and forms a unit viewing zone of a trapezoidal shape.
Figure 25A:
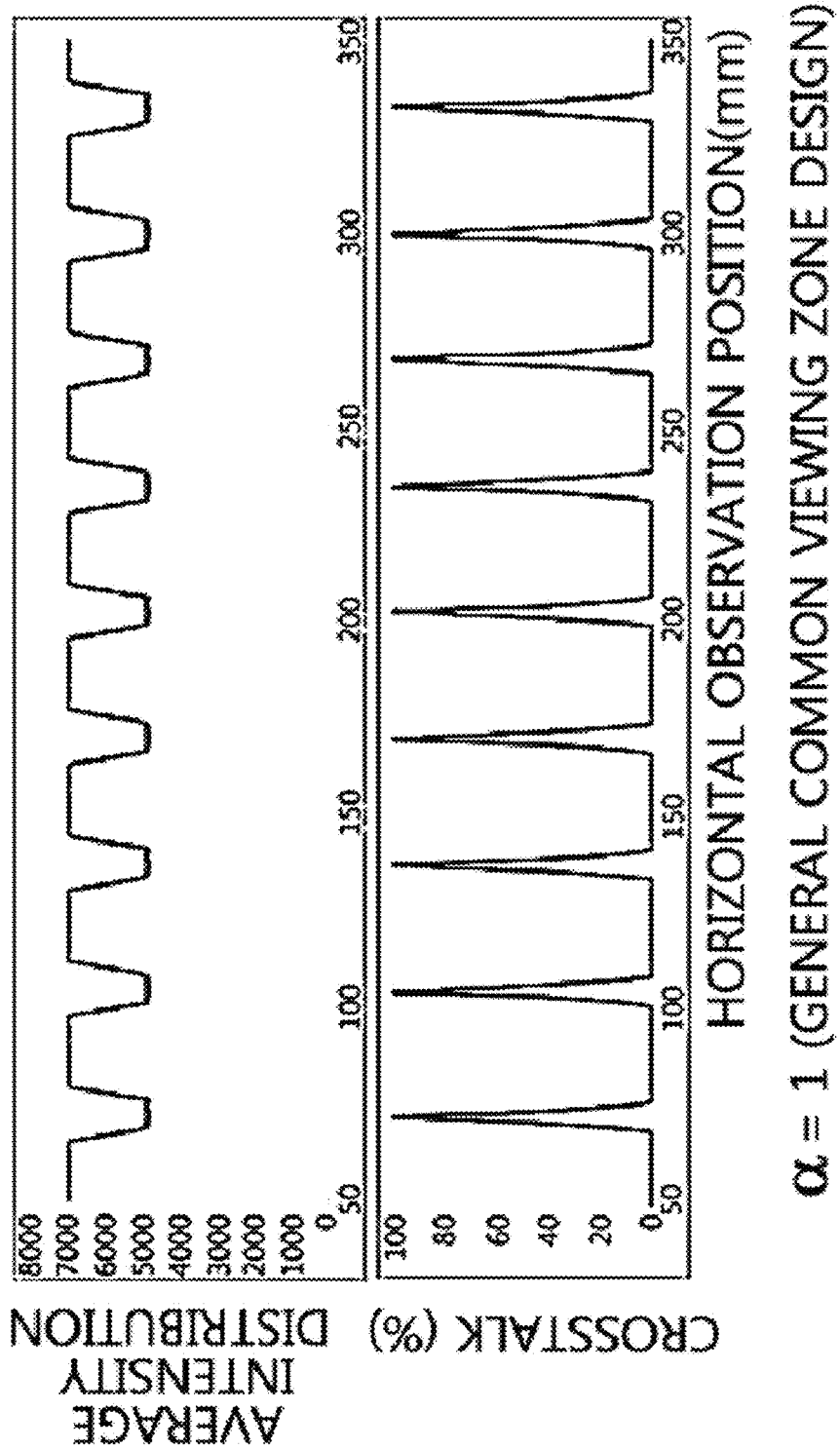
FIGS. 25A to 25F show average intensity distribution and crosstalk according to a ratio (a) of a size of a unit viewing zone formed by the 3-dimensional image display device according to an embodiment to a difference of horizontal positions of adjacent viewing zones.
Figure 25B:
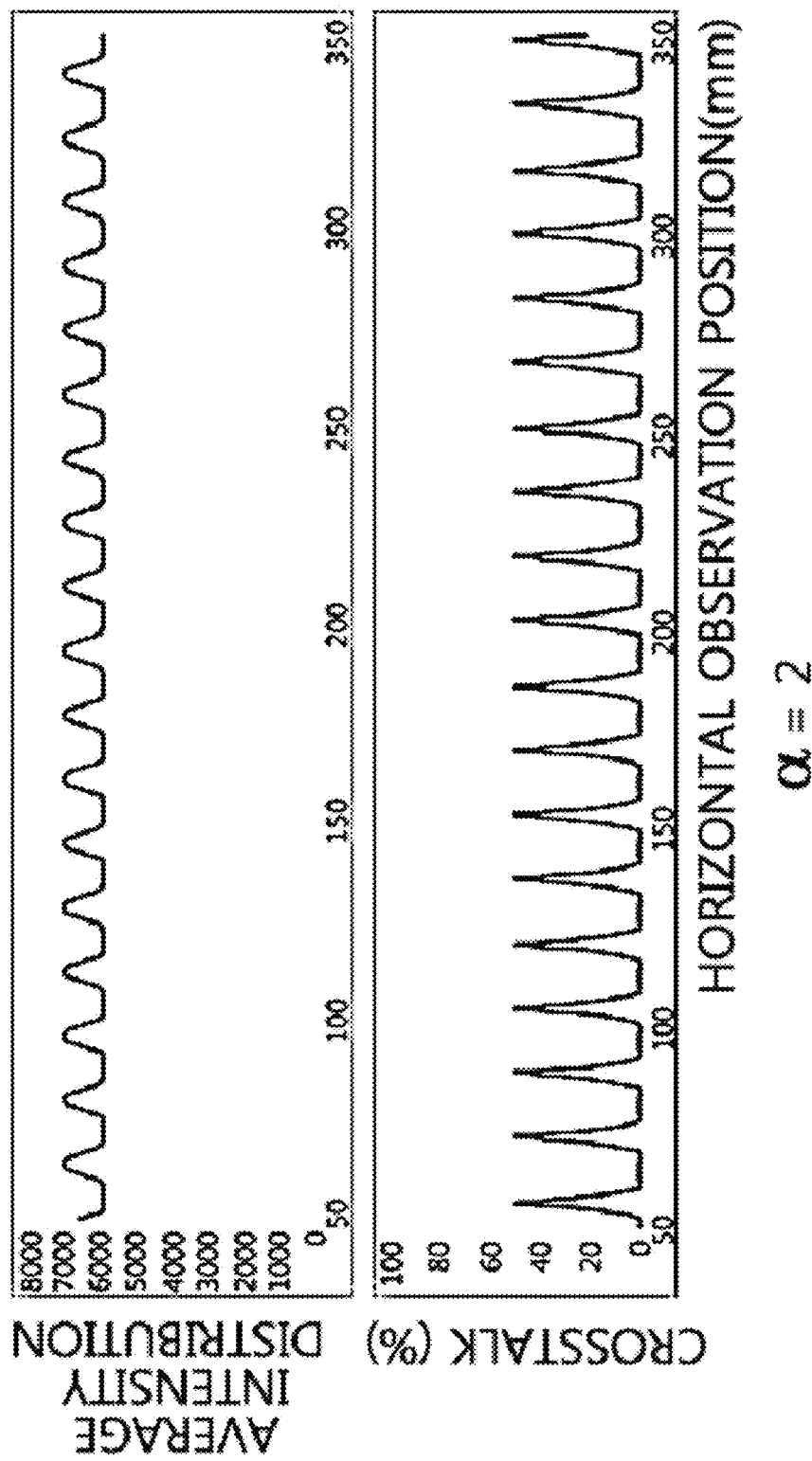
Figure 25C:
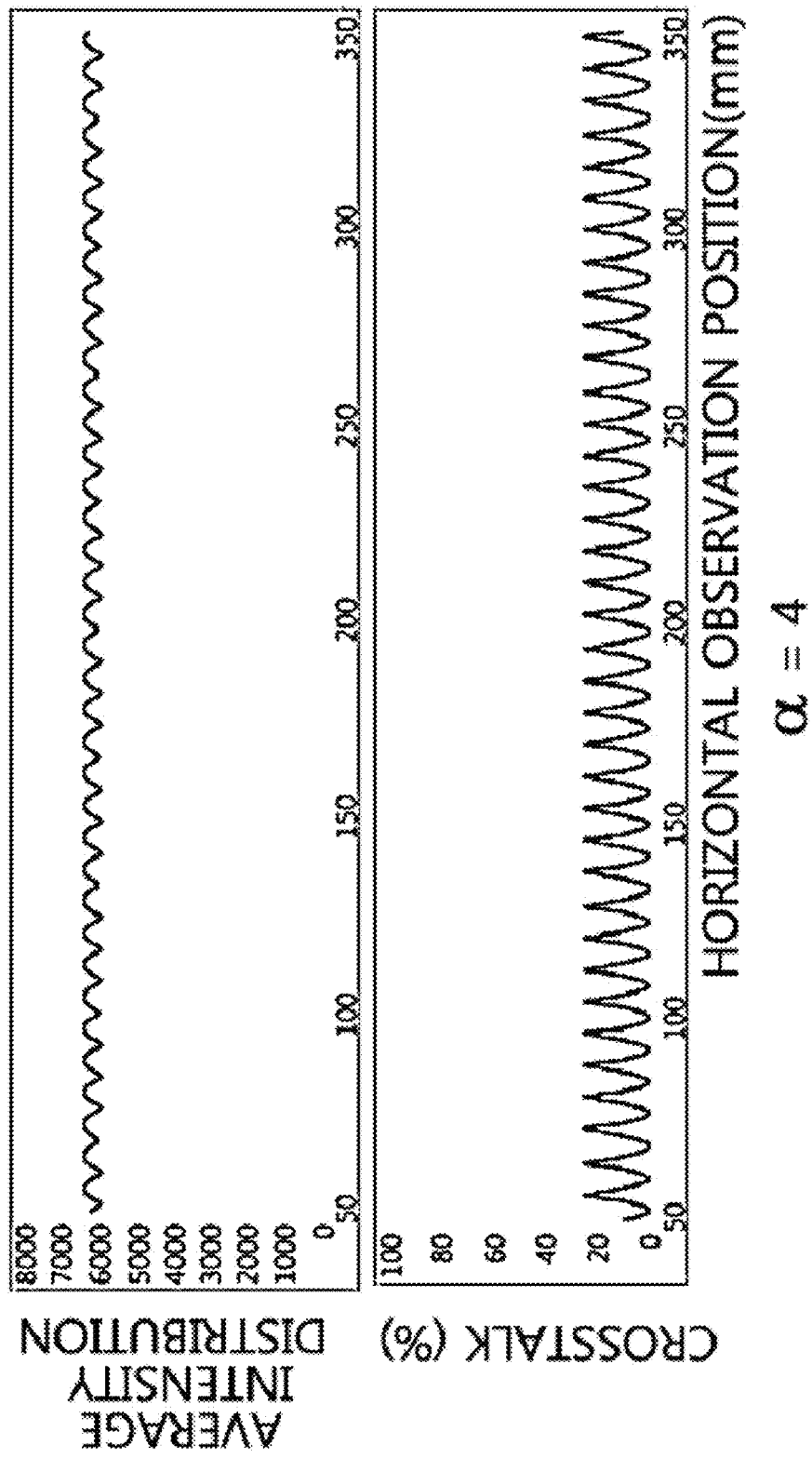
Figure 25D:
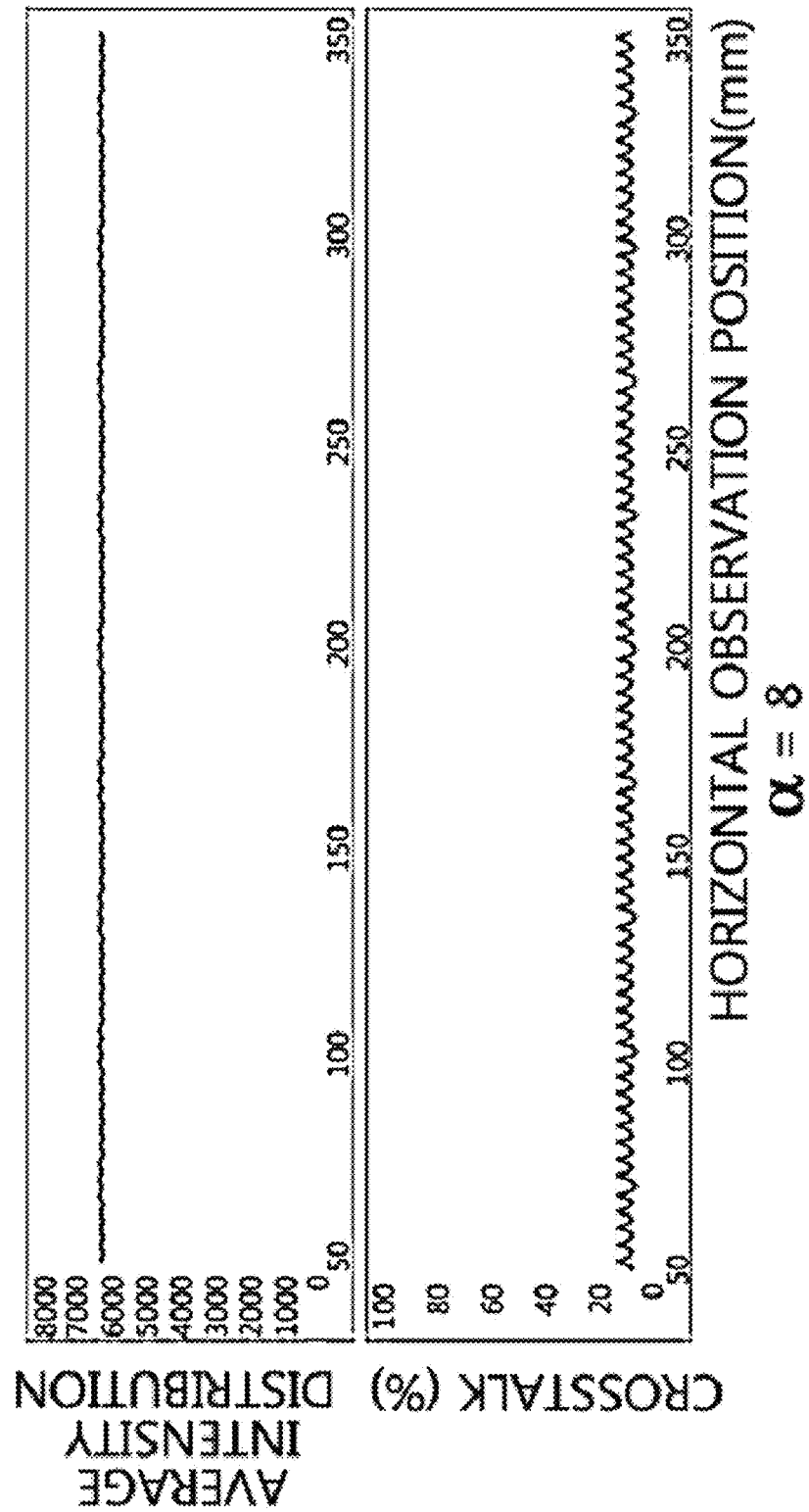
Figure 25E:
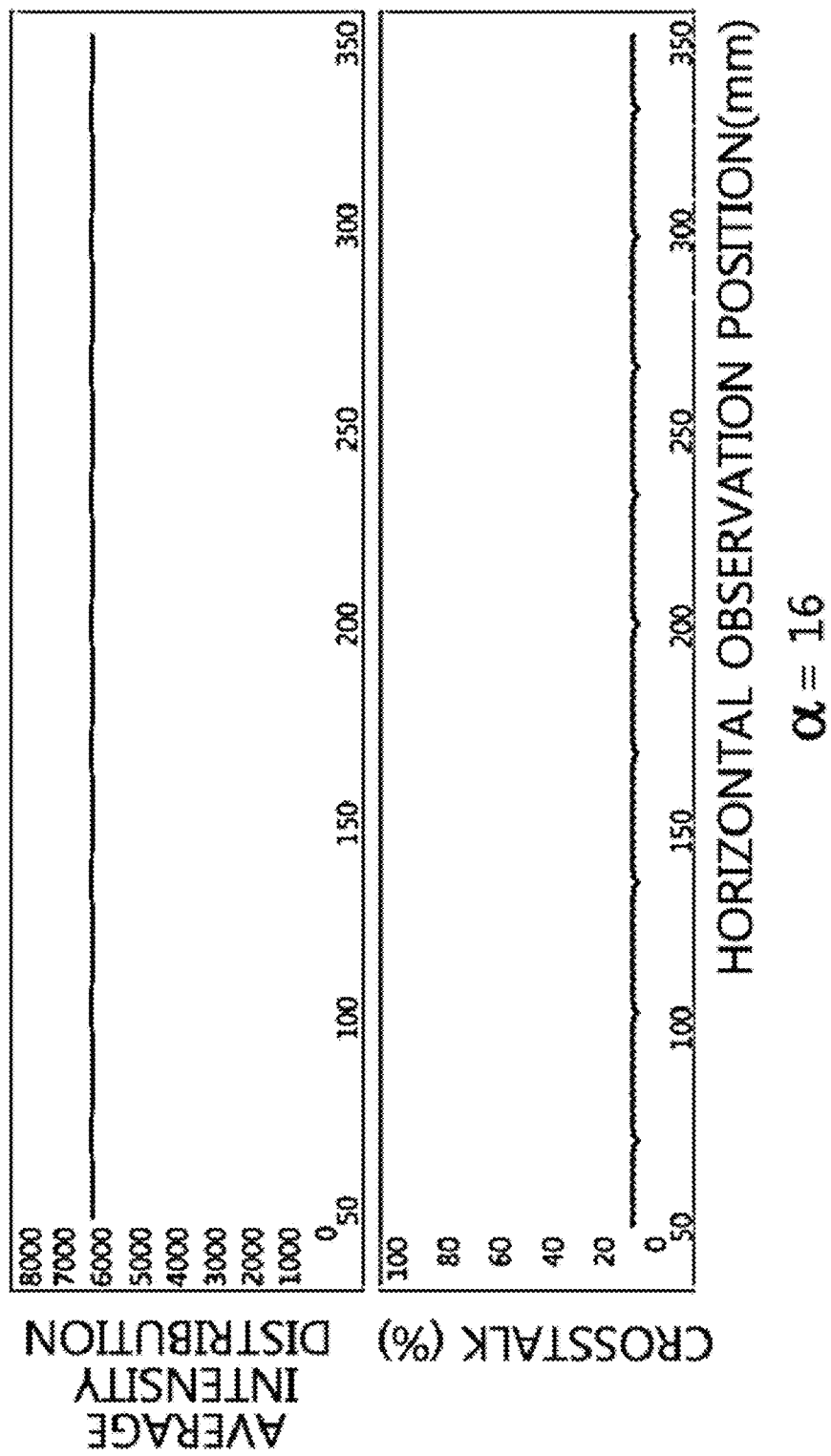
Figure 25F:
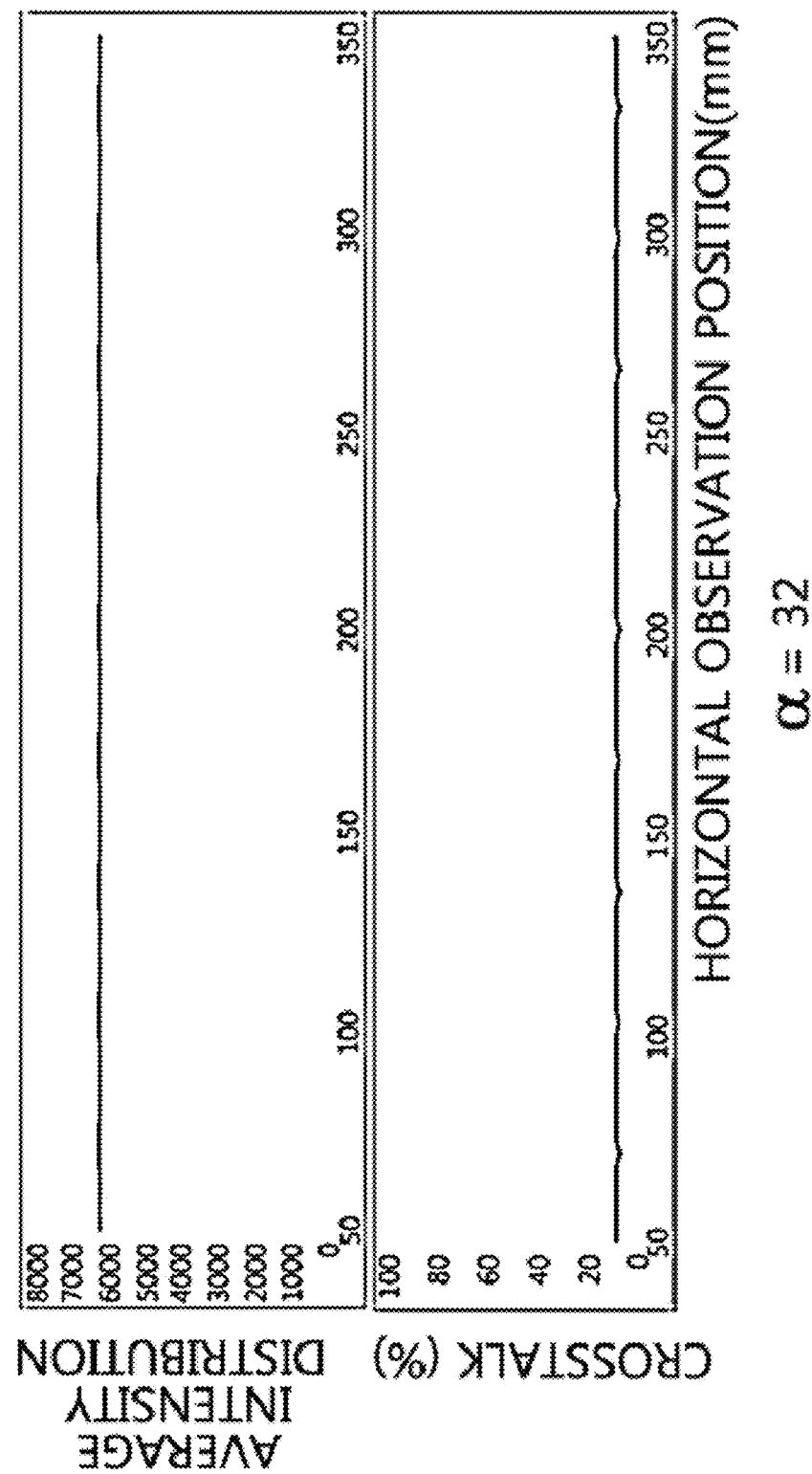

In an embodiment, the sub-pixel of the 3-dimensional image display device may form a unit viewing zone having a intensity of a trapezoidal shape. In other words, in this case, the intensity at the center of the unit viewing zone is maintained consistently within a certain range. FIG. 24 shows an example of intensity distribution, average intensity distribution and crosstalk of each viewing zone according to a horizontal position at an optimum viewing distance (OVD) of a 4-viewpoint 3-dimensional image display device which forms a common viewing zone and forms a unit viewing zone of a trapezoidal shape. The intensity distributions of viewing zones of different viewpoints exhibited different contours. Referring to the lowermost graph of FIG. 24, the crosstalk may be maintained to be 0 not only when the pupil of the observer is located at the center of the unit viewing zone in a horizontal direction but also when the pupil of the observer is deviated from the center by a certain distance.

However, if the pupil of the observer is in a region where the intensity distribution is not consistently maintained, maximum crosstalk of 100% may be experienced. In addition, the average intensity distribution varies according to a horizontal position of the observer, and this means that the brightness of image recognized by the observer is not regular.

Meanwhile, a cycle (a distance between two adjacent openings) of an opening of the parallax barrier, employed in an integral-photography 3-dimensional image display device not forming a common viewing zone, is expressed as a product if a width (Wp) of the sub-pixel and the number of viewpoints (N). In the central viewing zone formed by the integral-photography 3-dimensional image display device, the crosstalk is regular. However, the range of the central viewing zone is narrowed in comparison to the multi-view manner, and the average crosstalk in the central viewing zone is great. The central viewing zone of the 3-dimensional image display device not forming a common viewing zone means a horizontal region with no pseudoscopic vision at an observation position.

In order to solve problems of a multi-view 3-dimensional image display device forming a common viewing zone and an integral-photography 3-dimensional image display device, in an embodiment, the cycle of the opening of the parallax barrier of the 3-dimensional image display device is greater than the cycle of the opening of the parallax barrier of the multi-view 3-dimensional image display device forming a common viewing zone and smaller than the cycle of the opening of the parallax barrier of the integral-photography 3-dimensional image display device. The 3-dimensional image display device of this embodiment does not form a common viewing zone but forms a modified common viewing zone having a broader central viewing zone in comparison to the central viewing zone of the integral-photography 3-dimensional image display device. For example, as shown in FIG. 26, a viewing zone may be formed at an observation position.

When a ratio of a size of the unit viewing zone formed by the 3-dimensional image display device forming a modified common viewing zone to a difference of horizontal positions of adjacent viewing zones is α, FIGS. 25A to 25F show average intensity distribution and crosstalk according to α of the 3-dimensional image display device having a trapezoidal intensity shape of each viewing zone. Referring to FIG. 25, it can be found that when α is 8 or above, the crosstalk may be reduced to less than 3%, and the average intensity distribution does not also vary greatly according to the horizontal position. In other words, the observer may experience regular brightness and low average crosstalk even when moving horizontally. Therefore, the observer may observe a 3D image with an averaged viewpoint image in a region of the modified common viewing zone at an optimum viewing distance. The modified common viewing zone corresponds to an observation range (a maximum observation distance (L(max) from the OVD position) of the 3D image depicted in FIG. 22.

Figure 26:
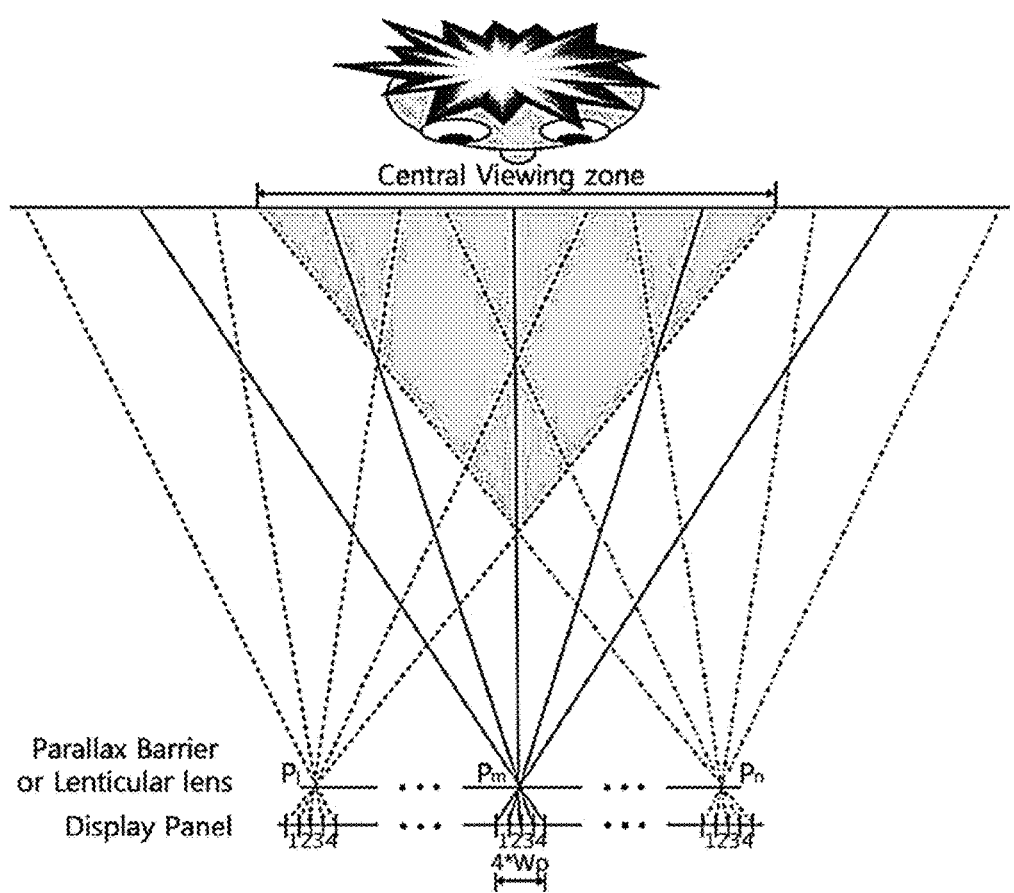
FIG. 26 is a schematic view showing a viewing zone formed by the 3-dimensional image display device according to an embodiment and an observer within a central viewing zone.

FIG. 26 is a schematic view showing a viewing zone formed by the 3-dimensional image display device according to an embodiment and an observer within a central viewing zone. In an embodiment, when the width of the parallax barrier opening is less than 30% of the width of the sub-pixel, if the observer moves within a range of the central viewing zone, the observer may watch a 3-dimensional image with average crosstalk of less than 10% without pupil tracking or any separate control according to a pupil position.

Figure 27:
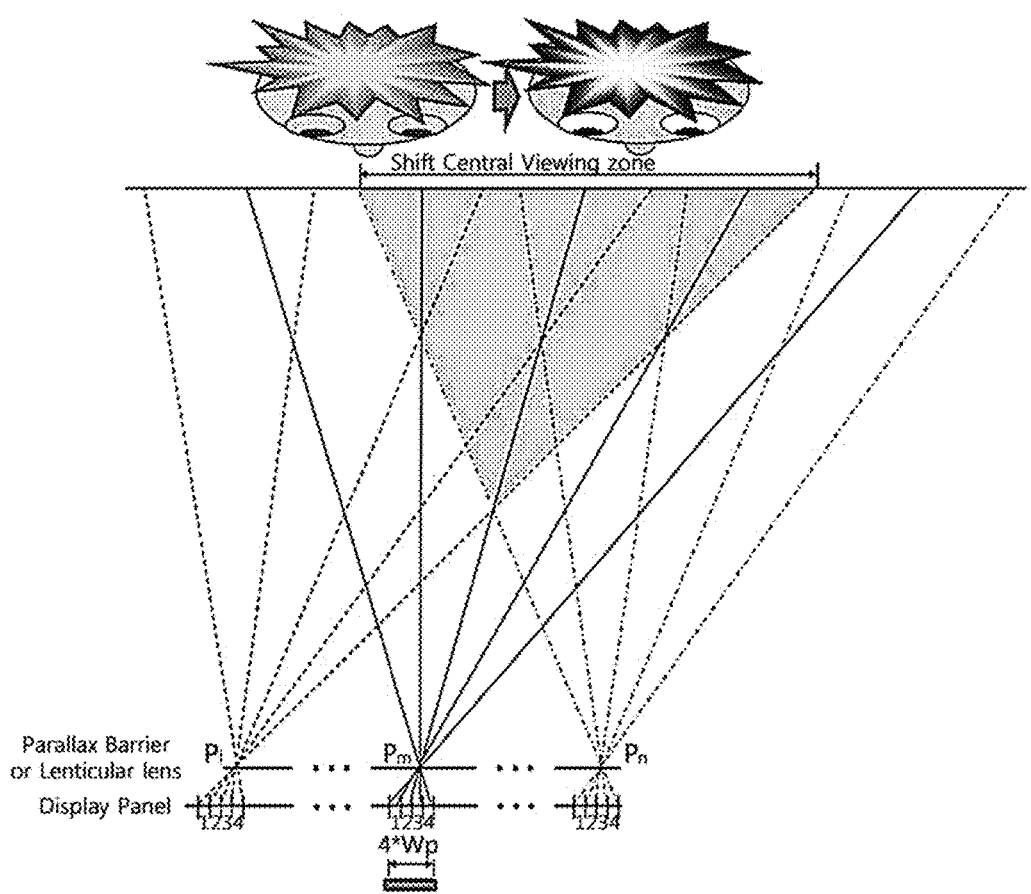
FIG. 27 is an exemplary view for illustrating a 3-dimensional image display device including a face-position or head-position tracking system according to an embodiment.

In addition, the 3-dimensional image display device according to an embodiment may further include a tracking system for tracking a face position or a head position of an observer. FIG. 27 is an exemplary view for illustrating a 3-dimensional image display device including a face-position or head-position tracking system. If the observer moves horizontally beyond the central viewing zone, the tracking system tracks a face or head position of the observer in real time. A control unit controlling the image display panel may rearrange a viewpoint image at a sub-pixel in real time based on the tracked face or head position so that the face of the observer is located within the central viewing. By doing so, the face of the observer may be always within the range of the central viewing zone by means of simple face tracking, without pupil tracking which demands precise works.

Even though the present disclosure have been described with reference to embodiments depicted in the accompanying drawings, this is just an example, and a person skilled in the art will understand that various changes and modifications can be made therefrom. However, such changes or modifications should be regarded as falling within the scope of the present disclosure. Therefore, the scope of the present disclosure should be defined based on the appended claims.

REFERENCE SYMBOLS

610: image display panel
620: light transmission region or light emission unit
630: sub-pixel
640: reference data row
650: at least one data row for forming an intervening viewing zone

What is claimed is:
1. A 3-dimensional image display device, comprising:
an image display panel including a plurality of sub-pixels arranged in a lattice pattern; and
an optical plate disposed spaced apart from the image display panel and including a plurality of light transmission regions or a backlight panel disposed spaced apart from the image display panel and including a plurality of light emission units,
wherein the plurality of light transmission regions or light emission units are inclined from a vertical direction,
wherein the image display panel includes:
a reference data row which forms a reference viewing zone; and
at least one data row which forms an intervening viewing zone,
wherein the reference viewing zone includes a plurality of unit reference viewing zones,
wherein the intervening viewing zone includes at least one unit intervening viewing zone located between the unit reference viewing zones adjacent to each other, wherein the reference data row and at least one data row forming the intervening viewing zone configure one cycle, and wherein a tilt angle of the plurality of light transmission regions or light emission units from a vertical direction is expressed as $$\theta = \arctan\left(\frac{3W_h}{W_v}\frac{k}{n}\right)$$

(where Wh represents a width of the sub-pixel in a horizontal direction, Wv represents a length of the sub-pixel in a vertical direction, n represents a natural number of 4 or above, k represents a natural number of 1 or above, k/n<⅓, and k/n is an irreducible fraction), and at least one data row forming the intervening viewing zone is a (n/3)−1 number of data rows when n is a multiple of 3 and an n−1 number of data row when n is not a multiple of 3.

2. The 3-dimensional image display device according to claim 1,
wherein the reference data row is a first data row among data rows of the one cycle.

3. The 3-dimensional image display device according to claim 1,
wherein the reference data row is a data row including a sub-pixel closest to a reference light transmission region or a reference light emission unit at one side of the reference light transmission region or the reference light emission unit, among data rows of the one cycle.

4. The 3-dimensional image display device according to claim 1,
wherein when at least one data row forming the intervening viewing zone is a k number of data rows, at least one data row forming the intervening viewing zone forms a k number of unit intervening viewing zones between two unit reference viewing zones adjacent to each other.

5. The 3-dimensional image display device according to claim 4,
wherein at least one data row forming the intervening viewing zone forms the k number of unit intervening viewing zones in order from a data row having a shortest minimum distance between a reference light transmission region or a reference light emission unit and a sub-pixel of the corresponding data row, at one side of the reference light transmission region or the reference light emission unit.

6. The 3-dimensional image display device according to claim 1,
Wherein the tilt angle θ of the plurality of light transmission regions or the light emission unit is equal to or greater than $$\tan^{-1}\left[\frac{3W_h}{W_v}\frac{k}{n'}\right]$$

(where n' represents a greatest value among natural numbers not greater than $$1 + \sqrt{\frac{4L^2\tan^2\frac{\pi}{10800} - (3k-1)^2 W_h^2}{W_v^2}},$$

L represents a distance between the 3-dimensional image display device and an observer, k represents a natural number of 1 or above, and k/n' is an irreducible fraction) and smaller than arctan (⅓).

7. The 3-dimensional image display device according to claim 1,
wherein each data row forms an N number of viewpoints, and
wherein among sub-pixels expressing the same viewpoint in each data row, two sub-pixels closest to each other have a distance smaller than $$2L \tan\frac{\beta}{2}$$

(where L represents a distance between the 3-dimensional image display device and an observer, and β is 1/30°).

8. The 3-dimensional image display device according to claim 7,
wherein N is a greatest value among natural numbers smaller than a value obtained by dividing $$2L \tan\frac{\beta}{2}$$

by a width of the sub-pixel.

9. The 3-dimensional image display device according to claim 1,
wherein at a maximum observation distance in a depth direction of the 3-dimensional image display device, a viewpoint interval between two unit viewing zones formed from image information mapped to two adjacent sub-pixels of one data row is narrower than an intervening pupil distance between both eyes of an observer.

10. The 3-dimensional image display device according to claim 1,
wherein the optical plate is a parallax barrier, the light transmission region is an opening of the parallax barrier; or the optical plate is a lenticular lens, and the light transmission region is a surface region of the lenticular lens through which light passes, and
wherein the light emission unit is a linear light source or a partially shielded surface light source.

11. A method for designing a 3-dimensional image display device, comprising:
determining the number of viewpoints and a viewpoint interval which are to be expressed as one data row of an image display panel including a plurality of sub-pixels;
determining a tilt angle θ of a plurality of light transmission regions included in an optical plate or a plurality of light emission units included in a backlight panel;
determining a reference data row for forming a reference viewing zone and at least one data row for forming an intervening viewing zone, based on the tilt angle θ;
mapping viewpoint data with sub-pixels of the reference data row; and
mapping the viewpoint data with sub-pixels of at least one data row where the intervening viewing zone is to be formed,
wherein the reference viewing zone includes a plurality of unit reference viewing zones, wherein the intervening viewing zone includes at least one unit intervening viewing zone located between the unit reference viewing zones adjacent to each other, wherein the determining of the reference data row for forming the reference viewing zone and the at least one data row for forming an intervening viewing zone, based on the tilt angle θ, comprises:

determining the number of data rows which configure one cycle according to the tilt angle θ, determining any one of data rows of the one cycle as the reference data row, and determining a data row other than the reference data row among the data rows of the one cycle as at least one data row where the intervening viewing zone is to be formed, wherein in the determining of the number of data rows which configure the one cycle according to the tilt angle θ, and wherein the tilt angle θ is expressed as $$\theta = \arctan\left(\frac{3W_h}{W_v}\frac{k}{n}\right)$$

(where Wh represents a width of a sub-pixel, Wv represents a length of the sub-pixel, n represents a natural number of 4 or above, k represents a natural number of 1 or above, k/n<⅓, and k/n is an irreducible fraction), and wherein the one cycle is configured with an n/3 number of successive data rows when n is a multiple of 3, and the one cycle is configured with an n number of successive data rows when n is not a multiple of 3.

12. The method for designing a 3-dimensional image display device according to claim 11, wherein in the determining of the any one of data rows of the one cycle as the reference data row, a first data row among the data rows of the one cycle is determined as the reference data row.

13. The method for designing a 3-dimensional image display device according to claim 11, wherein the determining of the any one of data rows of the one cycle as the reference data row comprises:

determining any one of the plurality of light transmission regions as a reference light transmission region or determining any one of the plurality of light emission units as a reference light emission unit; and determining a data row including a sub-pixel closest to the reference light transmission region or the reference light emission unit at one side of the reference light transmission region or the reference light emission unit as a reference data row, among the data rows of the one cycle.

14. The method for designing a 3-dimensional image display device according to claim 13, wherein in the mapping of the viewpoint data with the sub-pixels of the at least one data row where the intervening viewing zone is to be formed, when at least one data row where the intervening viewing zone is to be formed is a k number of data row, the viewpoint data is mapped with the sub-pixels of the at least one data row where the intervening viewing zone is to be formed so that at least one data row forming the intervening viewing zone forms a k number of unit intervening viewing zones between two unit reference viewing zones adjacent to each other.

15. The method for designing a 3-dimensional image display device according to claim 14, wherein in the mapping of the viewpoint data with the sub-pixels of the at least one data row where the intervening viewing zone is to be formed, the viewpoint data is mapped so that the k number of unit intervening viewing zones is formed in order from a data row having a shortest minimum distance between the reference light transmission region or the reference light emission unit and a sub-pixel of the corresponding data row, at one side of the reference light transmission region or the reference light emission unit.

16. The method for designing a 3-dimensional image display device according to claim 11, wherein in the determining of the tilt angle θ, the tilt angle θ is determined within a range equal to or greater than $$\tan^{-1}\left[\frac{3W_h}{W_v}\frac{k}{n'}\right]$$

(where n' represents a greatest value among natural numbers not greater than $$1+\sqrt{\frac{4L^2\tan^2\frac{\pi}{10800}-(3k-1)^2 W_h^2}{W_v^2}},$$

L represents a distance between the 3-dimensional image display device and an observer, k represents a natural number of 1 or above, and k/n' is an irreducible fraction) and smaller than arctan (⅓).

17. The method for designing a 3-dimensional image display device according to claim 11, wherein in the determining of the number of viewpoints and the viewpoint interval which are to be expressed as the one data row, the number of viewpoints to be expressed as the one data row is determined so that a distance of two sub-pixels closest to each other among sub-pixels mapped with the same viewpoint data in the one data row is smaller than $$2L\tan\frac{\beta}{2}$$

(where L represents a distance between the 3-dimensional image display device and an observer, and β is 1/30°).

18. The method for designing a 3-dimensional image display device according to claim 17, wherein in the determining of the number of viewpoints and the viewpoint interval which are to be expressed as the one data row, the number of viewpoints to be expressed as the one data row is determined as a greatest value among natural numbers smaller than a value obtained by dividing $$2L\tan\frac{\beta}{2}$$

by a width of the sub-pixel.

19. The method for designing a 3-dimensional image display device according to claim 11, further comprising:
   determining a width of the sub-pixel so that a viewpoint interval between two unit viewing zones formed from image information mapped to two adjacent sub-pixels of one data row is narrower than an intervening pupil distance between both eyes of an observer, at a maximum observation distance in a depth direction of the 3-dimensional image display device.

* * * * *